United States Patent
Kitanaka

(10) Patent No.: US 9,013,135 B2
(45) Date of Patent: Apr. 21, 2015

(54) POWER CONVERTING APPARATUS FOR ELECTRIC MOTOR VEHICLE PROPULSION

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 84 days.

(21) Appl. No.: 13/386,326

(22) PCT Filed: Jul. 1, 2010

(86) PCT No.: PCT/JP2010/061273
§ 371 (c)(1),
(2), (4) Date: Jan. 20, 2012

(87) PCT Pub. No.: WO2011/021443
PCT Pub. Date: Feb. 24, 2011

(65) Prior Publication Data
US 2012/0112669 A1 May 10, 2012

(30) Foreign Application Priority Data
Aug. 17, 2009 (WO) .................. PCT/JP2009/064406

(51) Int. Cl.
*H02P 27/04* (2006.01)
*B60L 3/00* (2006.01)
(Continued)

(52) U.S. Cl.
CPC ............ *B60L 3/0046* (2013.01); *Y02T 10/7005* (2013.01); *B60L 7/16* (2013.01);
(Continued)

(58) Field of Classification Search
CPC . H02M 5/45; H02M 1/12; H02M 2001/0006; H02P 27/04

USPC .................................. 318/800–803; 363/37
See application file for complete search history.

(56) References Cited

U.S. PATENT DOCUMENTS 5,070,290 A     12/1991  Iwasa et al.
5,504,667 A  *   4/1996  Tanaka et al. ................... 363/37
(Continued)

FOREIGN PATENT DOCUMENTS

EP   1745967 A1   1/2007
JP   8-98316 A    4/1996
(Continued)

OTHER PUBLICATIONS

International Search Report (PCT/ISA/210) issued on Sep. 21, 2010, by Japanese Patent Office as the International Searching Authority for International Application No. PCT/JP2010/061273.
(Continued)

*Primary Examiner* — Rina Duda
*Assistant Examiner* — Bickey Dhakal
(74) *Attorney, Agent, or Firm* — Buchanan Ingersoll & Rooney PC

(57) ABSTRACT

A power converting apparatus for electric motor vehicle propulsion is provided that is suitable for a use in which power regeneration from an inverter unit to a power storing unit or power supply from the power storing unit to the inverter unit is frequently used. The apparatus includes a converter unit that receives input of a power supply voltage from the outside, converts the power supply voltage into a direct current of a predetermined value, and outputs the direct current, the inverter unit that is connected to an output side of the converter unit and drives an electric motor, and the power storing unit that is connected to the output side of the converter unit. A converter control unit included in the converter unit generates a current command for the converter unit and controls charging and discharge currents to and from the power storing unit based on this current command.

22 Claims, 6 Drawing Sheets

(51) Int. Cl.
  *B60L 7/16*   (2006.01)
  *B60L 9/22*   (2006.01)
  *B60L 11/00*  (2006.01)
  *B60L 11/04*  (2006.01)
  *B60L 11/18*  (2006.01)
  *B60L 15/20*  (2006.01)
  *H02J 7/34*   (2006.01)
  *H02M 5/458*  (2006.01)

(52) U.S. Cl.
  CPC ............... *B60L 9/22* (2013.01); *B60L 11/005* (2013.01); *B60L 11/04* (2013.01); *B60L 11/1803* (2013.01); *B60L 11/1812* (2013.01); *B60L 11/1872* (2013.01); *B60L 15/2009* (2013.01); *H02M 5/4585* (2013.01); *H02J 7/34* (2013.01); *B60L 2210/10* (2013.01); *B60L 2240/12* (2013.01); *B60L 2240/36* (2013.01); *B60L 2240/421* (2013.01); *B60L 2240/423* (2013.01); *B60L 2240/529* (2013.01); *B60L 2240/545* (2013.01); *Y02T 10/7077* (2013.01); *Y02T 10/705* (2013.01); *Y02T 10/7022* (2013.01); *Y02T 10/7216* (2013.01); *Y02T 10/642* (2013.01); *Y02T 90/14* (2013.01); *Y02T 90/127* (2013.01); *B60L 2200/26* (2013.01); *Y02T 10/92* (2013.01); *Y02T 10/7275* (2013.01); *Y02T 10/70* (2013.01)

(56) References Cited

U.S. PATENT DOCUMENTS

| | | | |
|---|---|---|---|
| 6,538,412 B1 | 3/2003 | Klose et al. | |
| 8,040,101 B2 * | 10/2011 | Itoh et al. | 318/801 |
| 2007/0275819 A1 * | 11/2007 | Hirata | 477/5 |

FOREIGN PATENT DOCUMENTS

| | | |
|---|---|---|
| JP | 8-182111 A | 7/1996 |
| JP | A-11-299290 | 10/1999 |
| JP | 2002-369308 A | 12/2002 |
| JP | A-2002-369308 | 12/2002 |
| JP | 2005-278269 A | 10/2005 |
| JP | 2007-28874 A | 2/2007 |
| JP | 2008-99461 A | 4/2008 |
| JP | 2009-72003 A | 4/2009 |
| JP | 2009-171772 A | 7/2009 |
| JP | 2009-183078 A | 8/2009 |
| JP | 2009-207275 A | 9/2009 |
| RU | 2183570 C1 | 6/2002 |

OTHER PUBLICATIONS

Written Opinion (PCT/ISA/237) issued on Sep. 21, 2010, by Japanese Patent Office as the International Searching Authority for International Application No. PCT/JP2010/061273.

Decision of Patent Grant for corresponding application JP 2011-506518, issued Sep. 8, 2011, and English translation thereof.

Office Action from Russian Patent Office dated Jun. 4, 2013, issued in corresponding Russian Patent Appln. No. 2012110208/11(015317), with English translation thereof (6 pages).

Aug. 14, 2013 Canadian Office Action issued in Canadian Application No. 2,771,318.

Sep. 4, 2013 Chinese Office Action issued in Chinese Application No. 201080036549.6.

Jul. 26, 2013 Korean Office Action issued in Korean Application No. 10-2012-7004210.

Jan. 27, 2014 Korean Office Action issued in Korean Application No. 10-2012-7004210.

* cited by examiner
POWER CONVERTING APPARATUS FOR ELECTRIC MOTOR VEHICLE PROPULSION

FIELD

The present invention relates to a power converting apparatus for electric motor vehicle propulsion served for propulsion control for an electric motor vehicle.

BACKGROUND

In general, an electric motor vehicle is configured to capture electric power from an overhead wire with a current collector and drive, using the captured electric power, an electric motor with a power converting apparatus such as an inverter to travel.

In the electric motor vehicle, when the vehicle is braked, a so-called regenerative brake for regeneratively operating the electric motor to obtain braking force is used. Regenerated power generated at this point is supplied to loads such as other power running vehicles present near the own vehicle and an air conditioner of the vehicle via the overhead wire, a third rail, or the like and consumed in the loads.

However, in the early morning, at night, and a quiet railroad section where the number of trains in operation is small, in some case, no other vehicles are present near the own vehicle (regenerative loads are insufficient) and the regenerated power generated by the regenerative brake is not sufficiently consumed. When the regenerated power of the own vehicle is larger than power consumed by other vehicles, an overhead wire voltage rises. It is likely that various apparatuses connected to the overhead wire are tripped by an excess voltage or broken.

Therefore, when the overhead wire voltage rises, an inverter apparatus perform regeneration reducing control for reducing a regenerative brake and suppressing generation of regenerated power. When the regeneration reducing control is performed, because regenerative braking force is reduced by the regeneration reducing control, the reduced and insufficient braking force is supplemented by a frictional brake.

On the other hand, the use of the friction brake leads to discarding a part of kinetic energy of an electric motor vehicle in the atmosphere that can originally perform power regeneration. Therefore, there is a problem from the viewpoint of energy saving.

Therefore, a system is developed in which a power storage element such as a secondary battery or an electric double layer capacitor is mounted on an electric motor vehicle and regenerated power is stored in the power storage element according to necessity to obtain a stable regenerative brake even if regenerative loads are insufficient. Because the electric power stored in the power storage element can be used when the electric motor vehicle is accelerated next time, energy saving is realized.

When the electric motor vehicle mounted with the power storage element travels in a non-electrified section where electricity reception from an overhead wire is not performed, an electric motor is driven and accelerated using only the electric power from the power storage element. All regenerated power generated by the electric motor during braking is stored in the power storage element.

CITATION LIST

Patent Literature

Patent Literature 1: Japanese Patent Application Laid-open No. 2005-278269

SUMMARY

Technical Problem

The configuration of a driving apparatus for vehicle disclosed in Patent Literature 1 has a form in which an inverter unit that drives an electric motor and a DC DC converter unit (hereinafter simply abbreviated as "converter unit") to which a power storing device is connected and that controls charging in a power storage element and discharge from the power storage element are connected in parallel to each other to an overhead wire.

In this form, because the converter unit is interposed between the power storage element and the inverter unit, when charging in and discharge from the power storage element are performed from the inverter unit, a power loss occurs in the converter unit. Therefore, in a use in which a large-capacity power storage element is mounted and power regeneration from the inverter unit to the power storage element and power supply from the power storage element to the inverter unit are frequently used, system efficiency is deteriorated.

As a configuration in which the converter unit is not interposed between the power storage element and the inverter unit, a configuration in which an inverter unit that drives an electric motor and a power storage element are connected in a parallel relation to an output of a converter unit, an input of which is connected to an overhead wire, is conceivable. However, in this form, the converter unit needs to optimally control a power flow among the overhead wire, the inverter unit, and the power storage element according to a traveling condition of an electric motor vehicle. There are problems in a control method and a configuration of the converter unit.

The present invention has been devised in view of the above and it is an object of the present invention to provide a power converting apparatus for electric motor vehicle propulsion suitable for a use in which power regeneration from the inverter unit to the power storage element and power supply from the power storage element to the inverter unit are frequently used.

Solution to Problem

In order to solve the problem and attain the object, a power converting apparatus for electric motor vehicle propulsion according to the present invention includes: a first power converting unit that receives input of a power supply voltage from the outside, converts the power supply voltage into a DC current of a predetermined value, and outputs the DC current; a second power converting unit that is connected to an output side of the first power converting unit and drives a load; a power storing unit that is connected to the output side of the first power converting unit; and a first control unit that controls the first power converting unit.

Advantageous Effects of Invention

According to the present invention, a power converting circuit that controls charging and discharging currents to and from the power storing unit does not need to be provided between the converter unit and the power storing unit or between the inverter unit and the power storing unit. It is possible to provide a power converting apparatus for electric motor vehicle propulsion having high system efficiency that makes it possible to optimally control a power flow among the overhead wire, the inverter unit, and the power storing unit according to a traveling condition of the electric motor vehicle.

DESCRIPTION OF EMBODIMENTS

Power converting apparatuses for electric motor vehicle propulsion according to embodiments of the present invention are explained below with reference to the accompanying drawings. The present invention is not limited by the embodiments explained below.

First Embodiment

Figure 1:
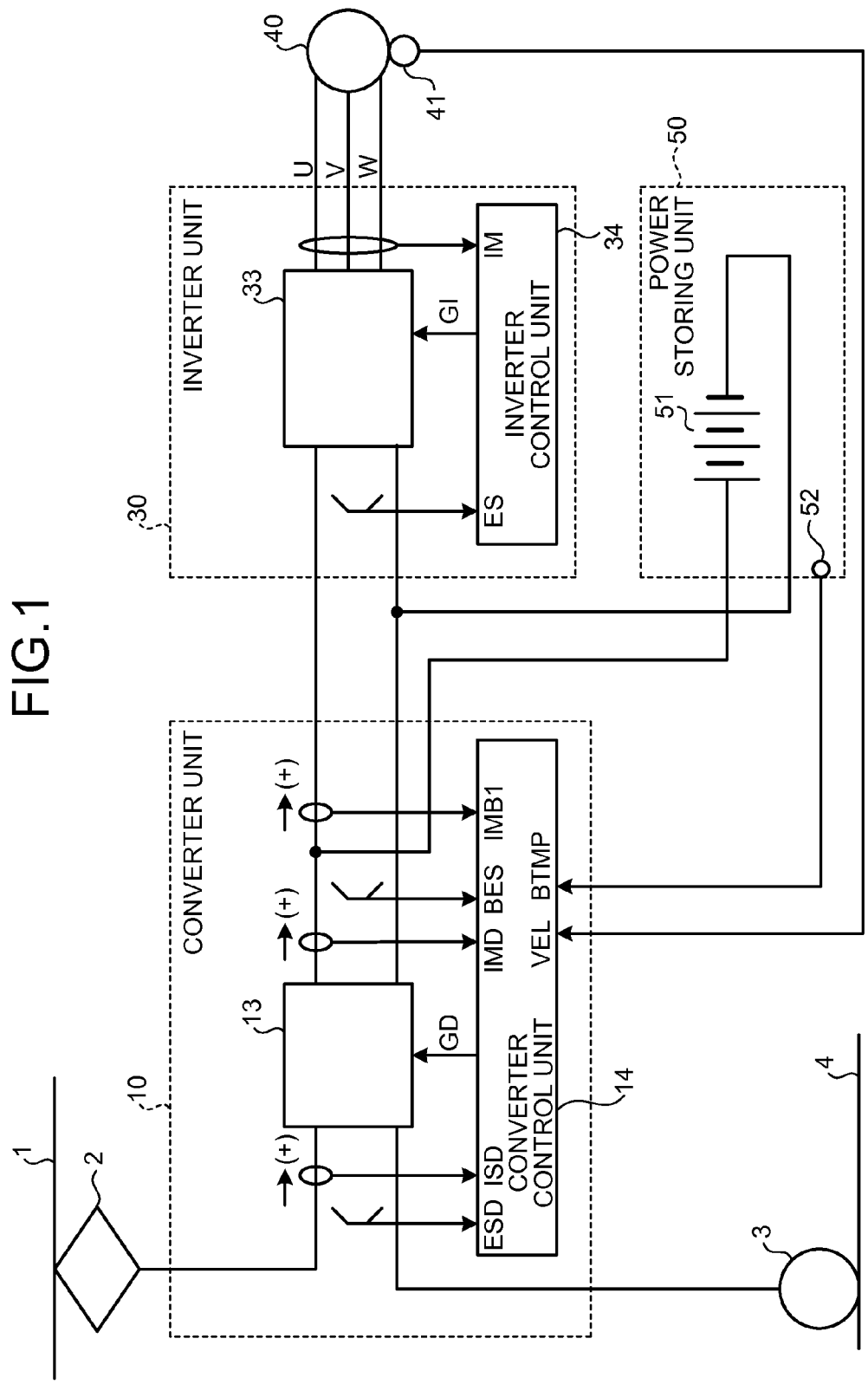
FIG. 1 is a diagram of a configuration example of a power converting apparatus for electric motor vehicle propulsion in a first embodiment of the present invention.

FIG. 1 is a diagram of a configuration example of a power converting apparatus for electric motor vehicle propulsion in a first embodiment of the present invention. As shown in FIG. 1, electric power from a not-shown transformer substation, which is an external power supply, is input to a converter unit 10, which is a first power converting unit and is, for example, a DC DC converter, from an overhead wire 1 via a current collector 2. A return current from the converter unit 10 is connected to a rail 4 through a wheel 3 and returns to a negative side of the not-shown transformer substation.

The converter unit 10 includes a converter circuit 13, which is a main circuit that performs DC/DC conversion, and a converter control unit 14, which is a first control unit. As the converter circuit 13, a bidirectional voltage boosting and lowering chopper circuit is suitable. In general, the converter circuit 13 includes, on an input side and an output side thereof, filter circuits including reactors and capacitors for smoothing a voltage and an electric current.

Figure 2:
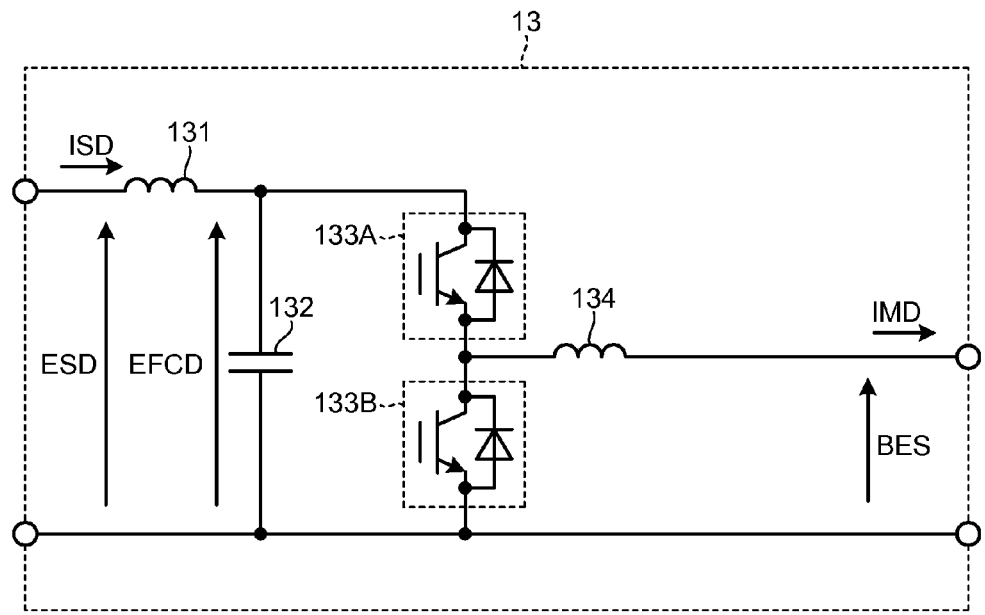
FIG. 2 is a diagram of a configuration example of a converter circuit in the first embodiment of the present invention.

In FIG. 2, a configuration example of the converter circuit 13 in the first embodiment of the present invention is shown. A form shown in FIG. 2 is a converter circuit that can be applied when a magnitude relation between a voltage EFCD on a primary side and a voltage BES on a secondary side of the converter circuit 13 is a relation EFCD>BES. The converter circuit 13 includes, in order from the input side, a filter reactor 131 and a filter capacitor 132 that form a filter circuit, a primary-side upper arm switching element 133A and a primary-side lower arm switching element 133B that form a switching circuit, and a smoothing reactor 134 connected to the secondary side of the switching circuit.

The converter circuit 13 shown in FIG. 2 can cause electric power having an arbitrary magnitude to pass in an arbitrary direction from the primary side to the secondary side or from the secondary side to the primary side by appropriately ON/OFF controlling the primary-side upper arm switching element 133A and the primary-side lower arm switching element 133B.

Figure 3:
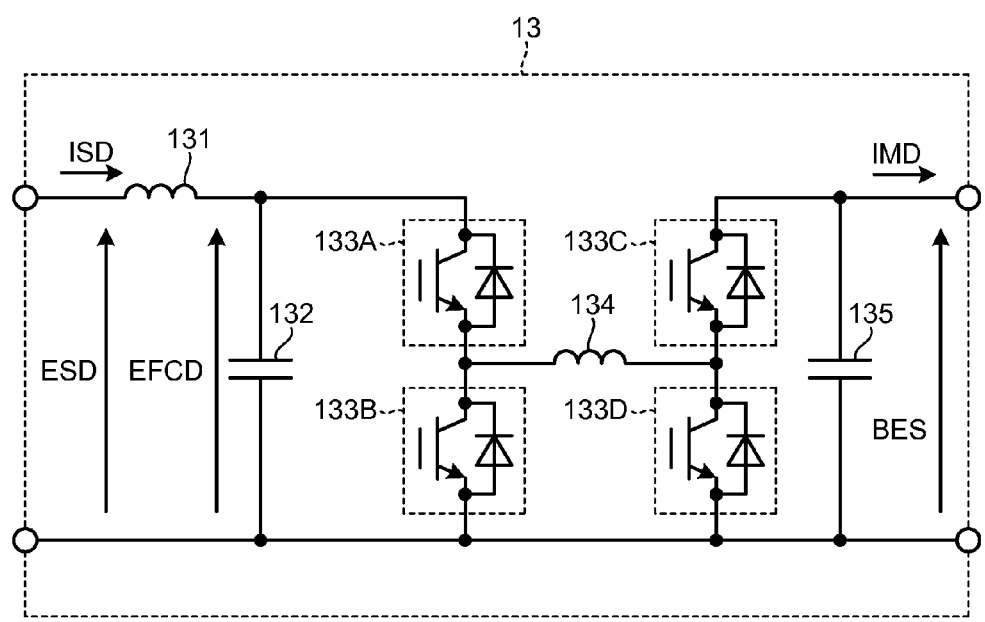
FIG. 3 is a diagram of a configuration example different from that shown in FIG. 2 of the converter circuit in the first embodiment of the present invention.

On the other hand, a form shown in FIG. 3 is a converter circuit that can be applied irrespective of the magnitude relation between the voltage EFCD on the primary side and the voltage BES on the secondary side of the converter circuit 13. The converter circuit includes, in order from the input side, the filter reactor 131 and the filter capacitor 132 that form a filter circuit, the primary-side upper arm switching element 133A and the primary-side lower arm switching element 133B that form a primary-side switching circuit, a secondary-side upper arm switching element 133C and a secondary-side lower arm switching element 133D that form a secondary-side lower arm switching circuit, the smoothing reactor 134 that connects the primary-side switching circuits and the secondary-side switching circuits, and a smoothing capacitor 135 connected to a secondary side of the secondary-side switching circuit.

The converter circuit 13 shown in FIG. 3 controls an electric current or electric power, which passes through the converter circuit 13, to be an electric current or electric power having an arbitrary magnitude (including zero) in an arbitrary direction from the primary side to the secondary side or from the secondary side to the primary side by appropriately ON/OFF controlling the primary-side upper arm switching element 133A, the primary-side lower arm switching element 133B, the secondary-side upper arm switching element 133C, and the secondary-side lower arm switching element 133D as explained below.

The converter circuit in the first embodiment can have a circuit configuration other than those shown in FIGS. 2 and 3. For example, in the example explained above, the overhead wire 1 is a DC power supply. However, when the overhead wire 1 is an AC power supply, as the converter circuit, a PWM converter circuit, which is a circuit that can convert input AC power into DC power in both directions, is suitable.

Referring back to FIG. 1, an output of the converter unit 10 branches to two systems. An inverter unit 30, which is a second power converting unit, is connected to one of the two systems. The inverter unit 30 includes an inverter circuit 33, which is a main circuit that performs DC/AC conversion, and an inverter control unit 34, which is a second control unit. As the inverter circuit, a voltage-type PWM inverter circuit is suitable. Explanation of the circuit components is omitted because the circuit components are publicly known. In general, the inverter circuit includes, on an input side thereof, a filter circuit including a reactor and a capacitor for smoothing a voltage and an electric current.

An electric motor 40 is connected to an AC output side of the inverter unit 30. A plurality of the electric motors 40 can be connected in parallel. The electric motor 40 drives the wheel 3 and causes the electric motor vehicle to travel. A rotation detector 41 that detects rotating speed of the electric motor 40 is provided in the electric motor 40. The rotation detector 41 inputs speed VEL, which is rotating speed information of the electric motor 40, to the converter control unit 14. The rotating speed information of the electric motor 40 is not limited to be obtained by the rotation detector 41 and can be detected by other means.

A power storing unit 50 in which power storage elements 51 such as secondary batteries or electric double layer capacitors are connected in series-parallel is connected to the other of the two systems of the output of the converter unit 10. The internal temperature of the power storing unit 50 (or the temperature of the power storage elements 51) is detected by a temperature detector 52 and input to the converter control unit 14.

Although not shown in the figure, the inverter unit 30 can include an auxiliary power supply device that performs power supply to an auxiliary machine such as an air conditioner. In this case, in the following explanation, an input current IMB1 of the inverter unit 30 includes a consumed current in this auxiliary machine in addition to a power-running consumed current or a regenerated current for driving the electric motor 40.

In the form shown in FIG. 1, one converter unit 10, one inverter unit 30, and one power storing unit 50 are connected. However, the development of the present invention is possible even in a configuration including a plurality of the converter units 10, a plurality of the inverter units 30, and a plurality of the power storing units 50.

The converter control unit 14 receives input of an input voltage ESD of the converter unit 10 (the converter circuit 13), the output voltage BES of the converter circuit 13 (which is hereinafter described as "voltage of the power storing unit 50" according to necessity), an input current ISD, an output current IMD, an output current IMB1 to the inverter unit 30, which is the second power converter unit, (which is hereinafter described as "input current of the inverter unit 30" according to necessity), the speed VEL of the electric motor 40, and battery temperature BTMP from the power storing unit 50. The converter control unit 14 outputs, based on these signals, a control signal GD to the switching elements 133A to 133D on the inside of the converter circuit 13.

In FIG. 1, the input voltage ESD of the converter unit 10 is input to the converter control unit 14. However, the voltage EFCD of the filter capacitor 132 (see FIGS. 2 and 3) of the converter circuit 13 can be input.

The converter control unit 14 is a section that is important for the converter unit 10 to optimally control a power flow among the overhead wire 1, the inverter unit 30, and the power storing unit 50 according to a traveling condition of the electric motor vehicle in a configuration in which the inverter unit 30, which drives the electric motor 40, and the power storing unit 50 are connected to an output of the converter unit 10, an input of which is connected to the overhead wire, in a parallel relation. The converter control unit 14 is a section that is the gist of this embodiment.

A further detailed configuration of the converter control unit 14 is explained later.

The inverter control unit 34 receives an input voltage ES of the inverter unit 30 and an output current IM of the inverter circuit 33 as inputs and outputs a control signal GI to switching elements on the inside of the inverter circuit 33.

The inverter control unit 34 controls an output current and an output voltage of the inverter circuit 33 such that the electric motor 40 explained later generates torque as commanded by a torque command. Details of the operation of the control are explained later.

To optimally control the power flow among the overhead wire 1, the inverter unit 30, and the power storing unit 50 according to a traveling condition of the electric motor vehicle, the converter control unit 14 and the inverter control unit 34 realize at least functions explained below, which form the gist of this embodiment.

(A) Power-Running Discharge Control

The converter control unit 14 and the inverter control unit 34 carry out assist discharge from the power storing unit 50 in a predetermined condition while preferentially receiving a power running current of the inverter unit 30 from the overhead wire 1.

(B) Regenerative Charging Control

The converter control unit 14 and the inverter control unit 34 regeneratively charge a regenerated current of the inverter unit 30 in the power storing unit 50 without delay within an allowance of the power storing unit 50 and regenerate the regenerated current, which is hard to be regenerated to the power storing unit 50, to the overhead wire 1.

(C) Forced Discharge Control

The converter control unit 14 and the inverter control unit 34 perform forced discharge of the power storing unit 50 with an arbitrary electric current.

(D) Forced Charging Control

The converter control unit 14 and the inverter control unit 34 perform forced charging of the power storing unit 50 with an arbitrary current.

To realize the functions explained above, first, the converter control unit 14 makes it possible to realize control explained below.

(a) The power-running discharge control, the regenerative charging control, the forced charging control, and the forced discharge control having high follow-up ability to frequent fluctuation in the input current IMB1 of the inverter unit 30 caused by a driving state (power running/regeneration) of the electric motor 40

(b) Control that takes into account a voltage state, a temperature state, and a maximum allowable current of the power storing unit 50

(c) Control that takes into account temperature rise suppression of the current collector 2 and a regenerative load state of the overhead wire 1

(d) Control that takes into account a maximum allowable current of the converter unit 10

(e) Control that is not affected by disturbances such as voltage fluctuation of the overhead wire 1 and voltage fluctuation caused by an internal resistance change or the like of the power storage element 51 and quickly responds to fluctuation in the input current IMB1 of the inverter unit 30

To make it possible to realize the controls, the converter control unit 14 is configured to be capable of performing high-speed control of an electric current of the power storing unit 50 on an instantaneous value basis at an arbitrary value including zero and in an arbitrary direction through high-speed control of an electric current or electric power passing through the converter unit 10 on an instantaneous value basis at an arbitrary value including zero and in an arbitrary direction. Specifically, the converter control unit 14 is configured as explained below.

Explanation of the Configuration of the Converter Control Unit

Figure 4:
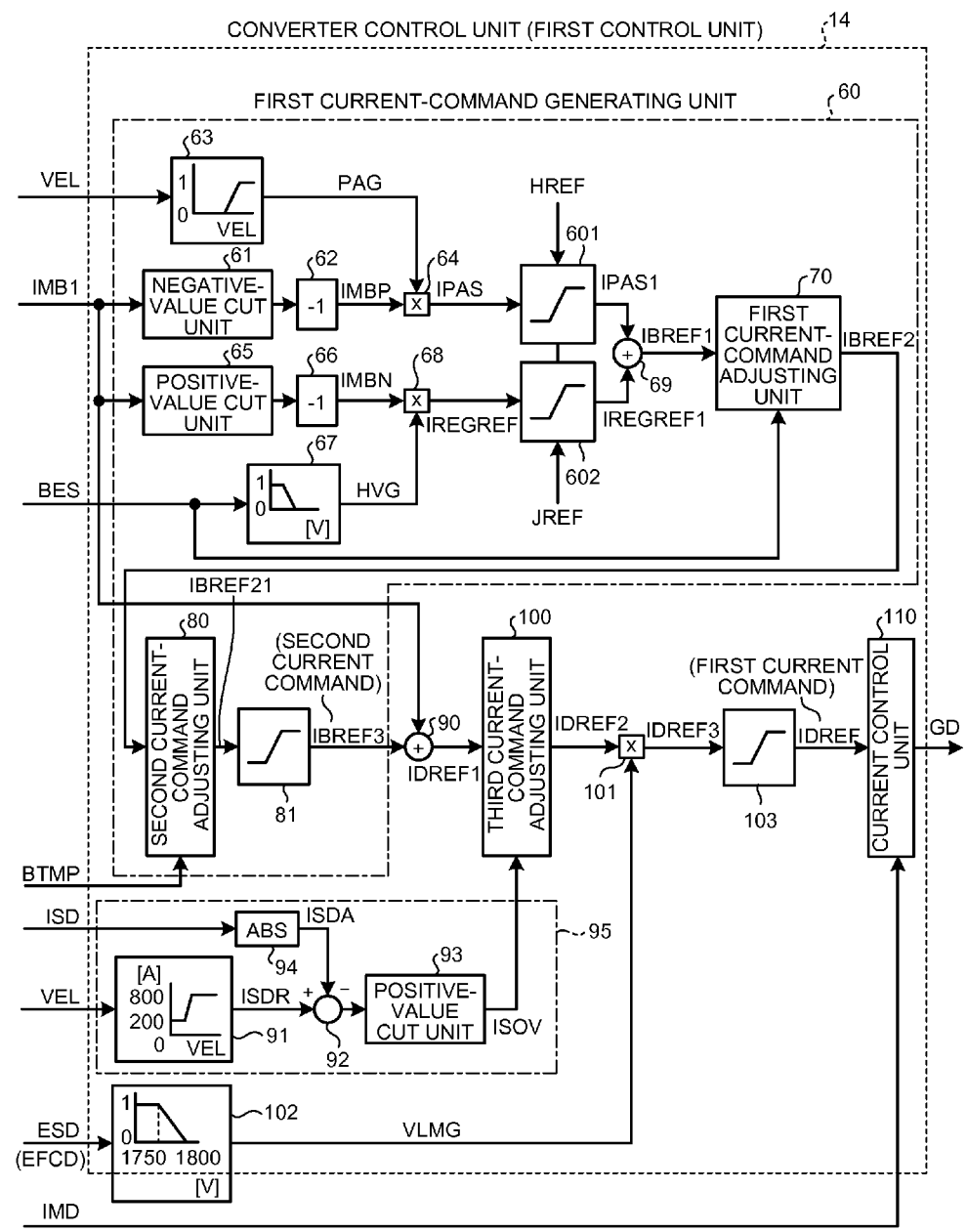
FIG. 4 is a diagram of a configuration example of a converter control unit in the first embodiment of the present invention.

FIG. 4 is a diagram of a configuration example of the converter control unit in the first embodiment of this embodiment. The converter control unit 14 includes a first current-command generating unit 60 that receives the speed VEL, the output current IMB1 of the converter unit 10, which is an electric current of an input section of the inverter unit 30, and the output voltage BES of the converter unit 10 as inputs and generates a second current command IBREF3, an adder 90 that calculates a sum of the second current command IBREF3 and the current IMB1 of the input section of the inverter unit 30 and generates a signal IDREF1, an input-current-limit-value setting unit 91 that receives input of the speed VEL and generates a signal ISDR, an absolute-value computing unit 94 that computes the magnitude of the input current ISD of the converter unit 10 and outputs a signal ISDA, a subtracter 92 that computes a difference between the signal ISDR and the signal ISDA and outputs the difference, a positive-value cut unit 93 that cuts a positive value of the output of the subtracter 92 and generates a signal ISOV, a third current-command adjusting unit 100 that receives the signal IDREF1 and the signal ISOV as inputs and generates a signal IDREF2, an input-voltage-rise suppressing unit 102 that receives input of the input voltage ESD of the converter unit 10 (or the filter capacitor voltage EFCD) and generates a gain VLMG, a multiplier 101 that receives the signal IDREF2 as an input, calculates a product of the signal IDREF2 and the signal VLMG, and generates a signal IDREF3, a current-command limiting unit 103 that limits the magnitude of the signal IDREF3 and generates a first current command IDREF, and a current control unit 110 that receives the first current command IDREF and the output current IMD of the converter circuit 13 as inputs and outputs a switching signal GD to the converter circuit 13.

It is desirable to detect the electric current IMB1 of the input section of the inverter unit 30 with a current detector. However, it is also possible to compute and calculate the electric current IMB1 from state quantities of an electric current and a voltage of an output section of the inverter unit 30.

The operations of units included in the first current-command generating unit 60 are explained. First, the speed VEL is input to a power-running-assist-amount setting unit 63. The power-running-assist-amount setting unit 63 generates, based on the input speed VEL, a power-running assist gain PAG, which takes a value from 0 to 1, and outputs the power-running assist gain PAG.

In this power-running-assist-amount setting unit 63, for example, processing for switching the power-running assist gain PAG from 0 to 0.5 under a condition that the speed VEL is equal to or larger than a predetermined value is performed. 50% of power-running power of the electric motor 40 can be supplied from the power storing unit 50 and the remaining 50% can be supplied from the overhead wire 1. Details of the operation are explained later.

The input to the power-running-assist-amount setting unit 63 can be other than the speed VEL shown in the figure. For example, the input can be the input voltage ESD of the converter unit 10, which is an amount related to an input voltage or input power, input power of the converter unit 10 (a product of ESD and ISD), or an input voltage or input power of the inverter unit 30. It is also possible to generate the power-running assist gain PAG based on these inputs.

The output current IMB1 of the converter unit 10 (equal to an electric current of the input section of the inverter unit 30) is directly output when IMB1 is positive. When IMB1 is negative, the output current IMB1 is input to a negative-value cut unit 61 that outputs zero. The polarity of the output signal of the negative-value cut unit 61 is inverted through a polarity inverting gain 62 to generate a signal IMBP.

For example, when the electric motor 40 performs a power-running operation, because IMB1 is positive, the signal IMBP has a value equal to IMB1. On the other hand, when the electric motor 40 performs a regenerative operation, because IMB1 is negative, the signal IMBP is zero. In other words, only when the electric motor 40 performs the power-running operation, the signal IMBP is generated as a value having magnitude equal to that of the output signal IMB1 and polarity opposite to that of the output signal IMB1. When the electric motor 40 performs the regenerative operation, the signal IMBP is zero.

The signal IMBP and the power-running assist gain PAG are multiplied together by a multiplier 64 to generate a signal IPAS. The signal IPAS is a power-running-assist discharge current command, which is a command for a discharge current for discharging a part of a power-running current of the inverter unit 30 from the power storing unit 50. When the electric motor 40 performs the power-running operation, the signal IPAS is calculated as a value obtained by multiplying the output current IMB1 with the gain PAG 0 to 1 according to setting of the power-running-assist-amount setting unit 63. In the configuration shown in FIG. 4, usually, the signal IPAS takes a negative value.

The output current IMB1 of the converter unit 10 is directly output when IMB1 is negative. When IMB1 is positive, the output current IMB1 is input to a positive-value cut unit 65 that outputs zero. The polarity of the output signal of the positive-value cut unit 65 is inverted through a polarity inverting gain 66 to generate a signal IMBN.

For example, when the electric motor 40 performs the power-running operation, because IMB1 is positive, the signal IMBN is zero. On the other hand, when the electric motor 40 performs the regenerative operation, because IMB1 is negative, the magnitude of the signal IMBN is equal to that of IMB1. In other words, only when the electric motor 40 performs the regenerative operation, the signal IMBN is generated as a value having magnitude equal to that of the output signal IMB1 and polarity opposite to that of the output signal IMB1. When the electric motor 40 performs the power-running operation, the signal IMBN is zero.

Subsequently, the voltage BES of the power storing unit 50 is input to an overcharge-suppression-gain generating unit 67. The overcharge-suppression-gain generating unit 67 generates, based on the input voltage BES, an overcharge suppression gain HVG, which takes a value from 0 to 1, and outputs the overcharge suppression gain HVG.

Figure 5:
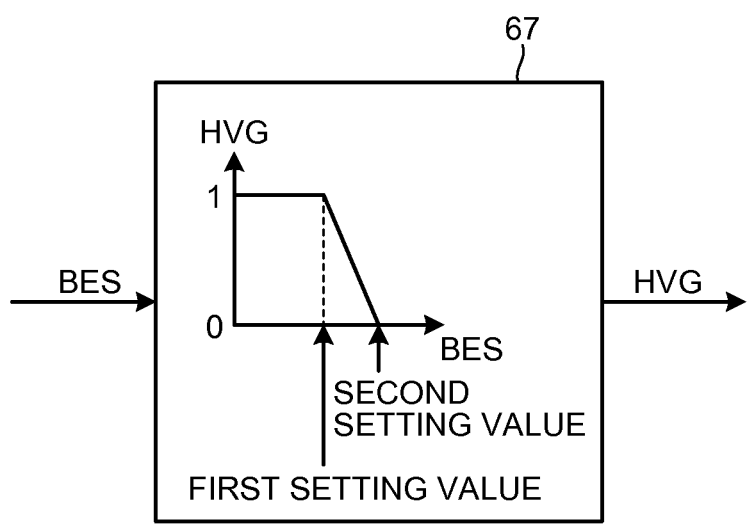
FIG. 5 is a diagram of a configuration example of an overcharge-suppression-gain generating unit in the first embodiment of the present invention.

FIG. 5 is a diagram of a configuration example of the overcharge-suppression-gain generating unit 67 in the first embodiment of the present invention.

In this overcharge-suppression-gain generating unit 67, when the voltage BES is equal to or smaller than a first set value, the gain HVG is set to 1. When the voltage BES exceeds a first setting value, the gain HVG is reduced from 1 according to the voltage BES. At a point when the voltage BES reaches a second setting value, which is an upper limit value, processing for reducing the gain HVG to 0 is performed.

The signal IMBN and the overcharge suppression gain HVG are multiplied together by a multiplier 68 and a signal IREGREF is generated. In the configuration shown in FIG. 4, usually, the signal IREGREF takes a positive value.

The signal IREGREF is a regenerative charging current command, which is a command for a charging current for charging a regenerated current from the inverter unit 30 in the power storing unit 50. As explained above, when the electric motor 40 performs the regenerative operation, the signal IREGREF is calculated based on the current IMB1 of the input section of the inverter unit 30 and the voltage BES of the power storing unit 50.

In this way, when the voltage BES of the power storing unit 50 is equal to or smaller than the first setting value, the signal IREGREF having magnitude equal to that of the regenerated current IMB1 from the inverter unit 30 can be generated. At a point when the voltage BES of the power storing unit 50 increases to be equal to or larger than the first setting value, the magnitude of the signal IREGREF can be suppressed. At a point when the voltage BES reaches the second setting value, which is the upper limit value, the signal IREGREF can be reduced to zero. By configuring the overcharge-suppression-gain generating unit 67 in this way, when a charging amount of the power storing unit 50 increases and the voltage BES increases to be larger than the predetermined value, it is possible to suppress the magnitude of the regenerative charging current command IREGREF, which is the command for a charging current to the power storing unit 50, and cause the power storing unit 50 to operate to prevent the voltage BES from increasing to be equal to or larger than the second setting value. Therefore, it is possible to generate the first current command IDREF for preventing the power storing unit 50 from being overcharged and suppress deterioration of the power storage element 51.

The signal IPAS is input to a forced-discharge-current setting unit 601. The forced-discharge-current setting unit 601 is a component for carrying out the forced discharge control, which is carried out when it is desired to forcibly discharge electric power of the power storing unit 50 at an arbitrary current value, irrespective of a state (power running or regeneration) of the inverter unit 30 and a state (carried out or not carried out) of power-running assist discharge. The forced-discharge-current setting unit 601 is a limiter having a variable upper limit setting value. The forced-discharge-current setting unit 601 receives input of the signal IPAS and a signal HREF, which is a forced discharge current setting value, and generates and outputs a signal IPAS1 adjusted to prevent an upper limit of the signal IPAS from increasing to be equal to or larger than the signal HREF. As the signal HREF, usually, a negative value is set. For example, when at least 100 amperes is forcibly discharged from the power storing unit 50, the signal HREF is set to −100. Then, because the signal IPAS1 does not increase to be equal to larger than −100 amperes, it is possible to perform discharge at least at 100 amperes as explained below in order. If the signal HREF is set to zero, the force discharge control is not performed.

The signal IREGREF is input to a forced-charging-current setting unit 602. The forced-charging-current setting unit 602 is a component for carrying out the forced charging control, which is carried out when it is desired to forcibly charge the electric power of the power storing unit 50 at an arbitrary current value, irrespective of a state (power running or regeneration) of the inverter unit 30.

The forced-charging-current setting unit 602 is a limiter having a variable lower limit setting value. The forced-charging-current setting unit 602 receives input of the signal IREGREF and a signal JRF, which is a forced charging current setting value, and outputs a signal IREGREF1 adjusted to prevent a lower limit of the signal IREGREF from decreasing to be equal to or smaller than the signal JREF. As the signal JREF, usually, a positive value is set. For example, when the power storing unit 50 is forcibly charged at least at 100 amperes, the signal JREF is set to +100. Then, because the signal IREGREF1 does not decrease to be equal to or smaller than +100 amperes, it is possible to perform charging at least at 100 amperes as explained below in order. If the signal JREF is set to zero, the forced charging control is not performed.

The signal IPAS1 and the signal IREGREF1 are added up by an adder 69 and a signal IBREF1 is generated. This signal IBREF1 is a power-running assist discharge/regenerative charging current command, which is a command for charging and discharge currents to and from the power storing unit 50 obtained by combining the power-running-assist discharge current command and the regenerative charging current command for the power storing unit 50.

The signal IBREF1 is input to a first current-command adjusting unit 70. The first current-command adjusting unit 70 generates a signal IBREF2 obtained by adjusting the signal IBREF1 based on the voltage BES of the power storing unit 50.

Figure 6:
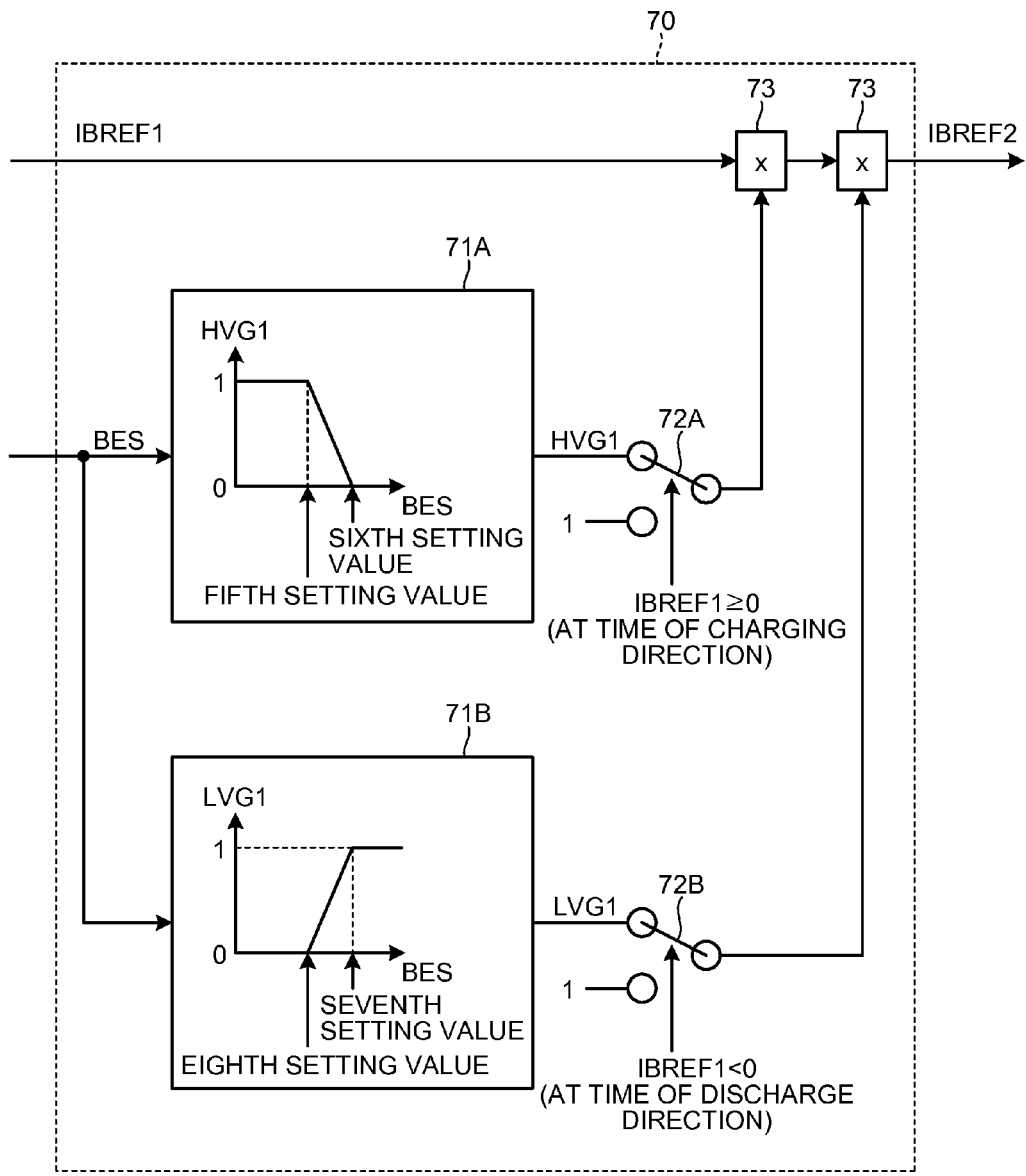
FIG. 6 is a diagram of a configuration example of a first current-command adjusting unit in the first embodiment of the present invention.

FIG. 6 is a diagram of a configuration example of the first current-command adjusting unit 70 in the first embodiment of the present invention. As shown in FIG. 6, the first current-command adjusting unit 70 includes a second overcharge-suppression-gain generating unit 71A that outputs a signal HVG1 based on the voltage BES, an over-discharge-suppression-gain generating unit 71B that outputs a signal LVG1 based on the voltage BES, a switch 72A that outputs HVG1 when the signal IBREF1 is positive (in a direction for charging the power storing unit 50) and outputs 1 otherwise, a switch 72B that outputs LVG1 when the signal IBREF1 is negative (in a direction for discharging the power storing unit 50) and outputs 1 otherwise, and a multiplier 73 that multiplies the signal IBREF1 with the signal HVG1 and the signal LVG1 to generate the signal IBREF2.

The first current-command adjusting unit 70 is an adjusting unit for suppressing overcharging/over-discharge of the power storing unit 50. When the signal IBREF1, which is a current command to the power storing unit 50, is positive (=the charging direction, regenerative charging), the first current-command adjusting unit 70 generates the signal IBREF2 obtained by suppressing the magnitude of the input signal IBREF1 to prevent the voltage BES from exceeding the predetermined value.

For example, when the voltage BES is equal to or smaller than a fifth setting value for starting suppression of a charging current, the first current-command adjusting unit 70 sets the signal HVG1 to 1 and sets the signal IBREF2 to a value equal to the signal IBREF1. When the voltage BES is equal to or larger than the fifth setting value for starting suppression of a charging current, the first current-command adjusting unit 70 sets the signal HVG1 to a value between 1 to 0 and sets the signal IBREF2 to a value obtained by suppressing the magnitude of the signal IBREF1. At a point when the voltage BES reaches a sixth setting value, which is an upper limit, the first current-command adjusting unit 70 sets the signal HVG1 to 0 and sets the signal IBREF2 to zero.

When the signal IBREF1, which is a current command to the power storing unit 50, is negative (=the discharge direction, power-running assist discharge), the first current-command adjusting unit 70 generates the signal IBREF2 obtained by suppressing the magnitude of the input signal IBREF1 to prevent the voltage BES from decreasing to be smaller than the predetermined value.

For example, when the voltage BES is equal to or larger than a seventh setting value for starting suppression of a discharge current, the first current-command adjusting unit 70 sets the signal IBREF2 to a value equal to the signal IBREF1. When the voltage BES is equal to or smaller than the seventh setting value for starting the suppression of a discharge current, the first current-command adjusting unit 70 sets the signal IBREF2 to a value obtained by suppressing the magnitude of the signal IBREF1. At a point when the voltage BES reaches an eighth setting value, which is a lower limit, the first current-command adjusting unit 70 sets the signal IBREF2 to zero.

In this way, the first current-command adjusting unit 70 generates the signal IBREF2, which is a charging and discharge current command adjusted to prevent the voltage BES of the power storing unit 50 from exceeding the sixth setting value, which is the upper limit value, and decreasing to be smaller than the eighth setting value, which is the lower limit value. By configuring the first current-command adjusting unit 70 in this way, it is possible to suppress deterioration due to overcharge and over-discharge of the power storage element 51.

The signal IBREF2 generated as explained above is input to a second current-command adjusting unit 80. The second current-command adjusting unit 80 generates a signal IBREF21 obtained by adjusting the signal IBREF2 based on temperature BTMP of the power storing unit 50.

The second current-command adjusting unit 80 is an adjusting unit that, when the temperature of the power storing unit 50 is higher than a predetermined value, reduces charging and discharge currents to and from the power storing unit 50 and, when the temperature of the power storing unit 50 is lower than the predetermined temperature, reduces, in particular, the charging current. The second current-command adjusting unit 80 generates the signal IBREF21 obtained by suppressing, based on the temperature BTMP, the magnitude of the input signal IBREF2 according to necessity. By configuring the second current-command adjusting unit 80 in this way, it is possible to suppress charging and discharge currents under high temperature or under low temperature. Therefore, it is possible to suppress deterioration of the power storage element 51.

The signal IBREF21 is input to a current-command limiting unit 81. The current-command limiting unit 81 is a limiter that limits an upper limit and a lower limit of the input signal IBREF21 to predetermined values and generates and outputs a signal IBREF3, which is a second current command. Usually, the current-command limiting unit 81 sets an allowable charging current maximum value of the power storage element 51 in the upper limit value and sets an allowable discharge current maximum value of the power storage element 51 in the lower limit value. By configuring the current-command limiting unit 81 in this way, it is possible to prevent charging and discharge currents exceeding the maximum allowable current of the power storing unit 50 from being fed to the power storing unit 50 and prevent damage to the power storing unit 50. Further, it is possible to separately set an allowable value of the charging current and an allowable value of the discharge current.

The signal IBREF3 is the second current command and is a final command for charging and discharge currents of the power storing unit 50 adjusted by the first current-command adjusting unit 70 and the second current-command adjusting unit 80.

The signal IBREF3 and the output current IMB1 of the converter unit 10 are added up by the adder 90 and the signal IDREF1 is generated.

The signal IDREF1 is input to the third current-command adjusting unit 100. The third current-command adjusting unit 100 generates the signal IDREF2 obtained by adjusting the signal IDREF1 based on the input signal ISOV.

The signal ISOV input to the third current-command adjusting unit 100 is explained.

First, the speed VEL is input to the input-current-limit-value setting unit 91. The input-current-limit-value setting unit 91 generates, based on the speed VEL, the signal ISDR, which is an upper limit of the input current ISD.

Subsequently, the input current ISD is input to the absolute-value computing unit 94. The absolute-value computing unit 94 generates the signal ISDA, which is a signal of the magnitude of the input current ISD.

In the subtracter 92, processing for subtracting the signal ISDA from the signal ISDR is performed. A difference value between the signal ISDA and the signal ISDR is input to the positive-value cut unit 93. The positive-value cut unit 93 generates the signal ISOV as a signal obtained by cutting a positive value.

With these configurations, the signal ISOV is generated at a point when the magnitude of the input current ISD exceeds the signal ISDR, which is the upper limit value.

When the signal ISOV is zero, the third current-command adjusting unit 100 directly outputs the input signal IDREF1 as the signal IDREF2. When the signal ISOV takes a non-zero negative value, the third current-command adjusting unit 100 generates the signal IDREF2 obtained by reducing, based on the signal ISOV, the magnitude of the input signal IDREF1. With this configuration, it is possible to obtain the signal IDREF2 adjusted to prevent the magnitude of the input current ISD of the converter unit 10 from exceeding the upper limit value ISDR.

It is conceivable to set the signal ISDR, which is the upper limit value of the input current ISD, to, for example, a low value (in the figure, 200 amperes) in a region where the speed VEL is lower than a predetermined value and a high value (in the figure, 800 amperes) in a region where the speed VEL is higher than the predetermined value. If the signal ISDR is set in this way, it is possible to limit the magnitude of the input current ISD small when the electric motor vehicle is stopped or traveling at low speed and set the magnitude of the input current ISD large in a region where the speed of the electric motor vehicle is high. Consequently, it is possible to suppress a collected current of the current collector 2, in particular, when the electric vehicle is stopped or traveling at low speed. Therefore, it is possible to suppress a temperature rise in the current collector 2 and a contact section of the overhead wire 1 and the current collector 2.

The temperature rise is supplementarily explained. While the electric motor vehicle is stopped, because a contact point of the current collector 2 and the overhead wire 1 does not change, it is conceivable that the contact point locally generates heat because of a loss caused by contact resistance and the input current ISD. While the electric motor vehicle is stopped, because a contact section of the current collector 2 and the overhead wire 1 does not slide, if the contact point is stained and a contact state is bad, it is conceivable that the contact resistance remains large and worsens the heat generation. The excessive heat generation causes, for example, melting of the current collector 2 and the overhead wire 1. On the other hand, while the electric motor vehicle is traveling, the contact point of the current collector 2 and the overhead wire 1 moves while sliding. Therefore, because the contact point always moves and the contact point is cleaned by the slide, the problem during the stop does not occur.

As explained above, the input current ISD can be set low when the electric motor vehicle is stopped or traveling at low speed. Therefore, it is possible to prevent heat generation at the contact point of the current collector 2 and the overhead wire 1.

It goes without saying that the configuration of an input-current limiting unit 95 including the input-current-limit-value setting unit 91, the absolute-value computing unit 94, the subtracter 92, and the positive-value cut unit 93 shown in FIG. 4 can be other configurations as long as the object can be realized.

The signal IDREF2 generated by the third current-command adjusting unit 100 is input to the multiplier 101. In the multiplier 101, the signal IDREF2 and the signal VLMG are multiplied together to generate the signal IDREF3. The signal IDREF3 is input to the current-command limiting unit 103. The current-command limiting unit 103 limits the magnitudes of the upper limit value and the lower limit value of the signal IDREF3 to be equal to or smaller than an allowable maximum current of the output current IMD of the converter circuit 13 and generates the signal IDREF, which is the first current command. This signal IDREF is a converter output current command, which is a command of the output current IMD of the converter circuit 13. The signal IDREF can be set to be equal to or smaller than an allowable current value of the converter circuit 13 in any case by this current-command limiting unit 103. Therefore, because it is possible to set the magnitude of the output current IMD of the converter circuit 13 controlled based on the signal IDREF to be equal to or smaller than the allowable current value, it is possible to prevent the converter unit 10 from being damaged by an excess current.

The signal VLMG input to the multiplier 101 is explained.

The signal VLMG is an input-current-rise suppressing gain for suppressing, if regenerative loads of the overhead wire 1 are insufficient when the electric motor 40 performs the regenerative operation or when the electric power of the power storing unit 50 is forcibly discharged to the overhead wire 1, the input voltage ESD of the converter unit 10 (or the voltage EFCD of the filter capacitor 132) from rising. Specifically, as shown in the figure, the input voltage ESD of the converter unit 10 (or the voltage EFCD of the filter capacitor 132) is input to the input-voltage-rise suppressing unit 102.

When the voltage ESD (or the voltage EFCD) is equal to or smaller than a predetermined value (for example, in the figure, 1750 volts), the input-voltage-rise suppressing unit 102 sets the signal VLMG to 1. At a point when the voltage ESD exceeds the predetermined value and reaches an upper limit value (in the figure, 1800 volts), the input-voltage-rise suppressing unit 102 sets the signal VLMG to zero. According to this processing, when the voltage ESD is equal to or smaller than the predetermined value (in this example, 1750 volts), the signal IDREF3 and the signal IDREF2 are equal. On the other hand, at a point when the voltage ESD reaches the upper limit value (in this example, 1800 volts), the signal IDREF3 decreases to zero.

In general, in an electric railway in which a nominal voltage of the overhead wire 1 is, for example, DC 1500 volts, it is necessary to prevent the voltage of the overhead wire 1 from exceeding 1750 volts to 1800 volts. However, with the configuration explained above, if regenerative loads of the overhead wire 1 are insufficient when the electric motor 40 performs the regenerative operation or the power storing unit 50 is forcibly discharged, i.e., when the converter unit 10 feeds electric power from the output side to the input side, it is possible to obtain the signal IDREF3 adjusted to prevent the input voltage ESD of the converter unit 10 from exceeding a predetermined upper limit value. Consequently, even when regenerative loads are insufficient, it is possible to prevent the converter unit 10 from being tripped by an excess voltage or being damaged.

As explained above, it is possible to obtain the converter output current IDREF, which is the first current command that can prevent the converter unit 10 from being tripped by an excess voltage or being damaged.

At the final stage of the converter control unit 14, the signal IDREF and the output current IMD of the converter unit 10 are input to the current control unit 110. The current control unit 110 carries out, based on a deviation between the signal IDREF and the output current IMD of the converter circuit 13, proportional integral control to match the output current IMD with the first current command IDREF, performs ON/OFF (PWM) control for switching elements of the converter unit 10, and generates a switching signal GD for the switching elements of the converter circuit 13.

With the converter control unit 14 configured as explained above, when the electric motor 40 performs the power-running operation, it is possible to arbitrarily set a distribution of electric power from the overhead wire 1 and electric power from the power storing unit 50 and supply power-running power to the inverter unit 30. When the electric motor 40 performs the regenerative operation, it is possible to absorb and charge regenerated power in the power storing unit 50.

In this case, it is possible to prevent the power storing unit 50 from being overcharged and over-discharged and perform appropriate charging and discharge corresponding to a temperature thereof.

Because the upper limit of the input current ISD of the converter unit 10 can be limited, it is possible to suppress the temperature of the current collector 2 and the contact section of the overhead wire 1 and the current collector 2 from rising.

Explanation of the Configuration of the Inverter Control Unit

Figure 7:
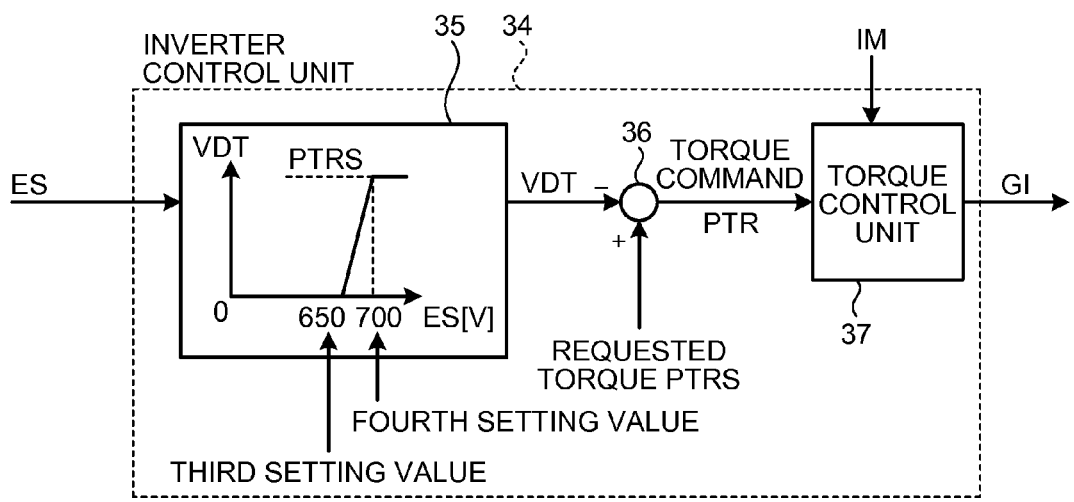
FIG. 7 is a diagram of a configuration example of an inverter control unit in the first embodiment of the present invention.

The configuration of the inverter control unit 34 is explained. FIG. 7 is a diagram of a configuration example of the inverter control unit in the first embodiment of the present invention.

The inverter control unit 34 includes a regenerative-torque-reduction-amount setting unit 35 that receives input of the input voltage ES of the inverter unit 30 and generates a torque reduction amount VDT based on ES, a subtracter 36 that subtracts the torque reduction amount VDT from requested torque PTRS, which is a requested value of regenerative brake torque generated by a not-shown external control unit and outputs a result of the subtraction as a torque command PTR, and a torque control unit 37 that performs torque control such that the electric motor 40 generates regenerative torque as commanded by the torque command PTR.

For example, in a region where the voltage ES is less than a third setting value (in the example shown in FIG. 7, 650 volts), the regenerative-torque-reduction-amount setting unit 35 sets the torque reduction amount VDT to zero. In this case, the requested torque PTRS is equal to the torque command PTR. Processing for increasing the torque reduction amount VDT in a region where the voltage ES is equal to or larger than the third setting value (650 volts) and increasing, at a point when the voltage ES further rises to be equal to or larger than a fourth setting value (700 volts), the torque reduction amount VDT until the torque reduction amount VDT becomes equal to the requested torque PTRS and setting the torque command PTR to zero is performed.

Because the inverter control unit 34 is configured as explained above, when the electric motor 40 performs the regenerative operation and the power storing unit 50 is charged by regenerated power, it is possible to reduce the regenerative torque of the electric motor 40 to suppress the regenerated power such that the voltage BES of the power storing unit 50 does not exceeds the fourth setting value, which is the upper limit value, and prevent the power storing unit 50 from being overcharged.

It is desirable to set the third setting value for starting reduction of the regenerative torque in the regenerative-torque-reduction-amount setting unit 35 to a value larger than the first setting value for starting suppression of a charging current to the power storing unit 50 set by the overcharge-suppression-gain generating unit 67 or the fifth setting value for starting suppression of a charging current to the power storing unit 50 set by the first current-command adjusting unit 70.

Further, it is desirable to set the third setting value for starting reduction of the regenerative torque in the regenerative-torque-reduction-amount setting unit 35 to a value larger than the second setting value for reducing a charging current to the power storing unit 50 to substantially zero set by the overcharge-suppression-gain generating unit 67 or the sixth setting value for reducing a charging current to the power storing unit 50 to substantially zero set by the first current-command adjusting unit 70.

In this way, if a charging amount of the power storing unit 50 increases and the voltage BES rises to exceed the first setting value or the fifth setting value when the power storing unit 50 is charged at a regenerated current while the electric motor 40 performs the regenerative operation, first, the magnitude of the second current command IBREF3, which is a command for a charging current to the power storing unit 50, is suppressed in the overcharge-suppression-gain generating unit 67 or the first current-command adjusting unit 70 and, simultaneously with the charging in the power storing unit 50 being suppressed, regenerated current equivalent to a suppressed amount operates to be regenerated to the overhead wire 1 via the converter unit 10. Therefore, even when a charging amount of the power storing unit 50 is high and the power storing unit 50 cannot sufficiently receive the regenerated current, the regenerated current of the electric motor 40 is not reduced and a continuous and stable regenerative brake is obtained.

Further, when the regenerative operation from the electric motor 40 continues, the charging amount of the power storing unit 50 further increases, and the voltage BES reaches the second setting value or the sixth setting value, the operation for reducing the magnitude of the second current command IBREF3, which is the command for the charging current to the power storing unit 50, to substantially zero is performed in the overcharge-suppression-gain generating unit 67 or the first current-command adjusting unit 70. Therefore, all the regenerated current from the electric motor 40 operates to be regenerated to the overhead wire 1 via the converter unit 10. The regenerated current does not further increase the charging amount of the power storing unit 50. In other words, overcharging can be suppressed. Even in this case, the third setting value for starting reduction of regenerative torque is set to a value larger than the second setting value or the sixth setting value. Therefore, the regenerated power of the electric motor 40 is not reduced and a continuous and stable regenerative brake is obtained.

In this state, when insufficiency of regenerative loads of the overhead wire 1 occurs, the voltage ESD of the overhead wire 1 increases. Therefore, because the first current command IDREF is reduced by the signal VLMG according to the increase in the voltage ESD, the converter unit 10 can suppress a regenerated current to the overhead wire 1 and suppress a rise in an input voltage. At this point, the regenerated current of the electric motor 40 flows into the power storing unit 50 by a suppressed amount of the regenerated current to the overhead wire 1. Therefore, because the voltage BES further rises, the regenerative torque of the electric motor 40 is reduced by the inverter unit 30 at a stage when the voltage ES exceeds the third setting value for starting reduction of regenerative torque (a value larger than the first setting value for starting suppression of a charging current to the power storing unit 50 set by the overcharge-suppression-gain generating unit 67 or the fifth setting value for starting suppression of a charging current to the power storing unit 50 set by the first current-command adjusting unit 70) in the regenerative-torque-reduction-amount setting unit 35. Because the regenerative torque is reduced to zero at a point when the voltage BES reaches the fourth setting value, the power storing unit 50 is not further charged. Therefore, an allowable upper limit voltage of the power storing unit 50 only has to be set as the fourth setting value.

Because the inverter control unit 34 operates as explained above, even if a charged state of the power storing unit 50 increases and the voltage BES reaches near the upper limit, when regenerative loads of the overhead wire 1 are sufficient, the inverter control unit 34 continuously operates to regenerate the regenerated power of the electric motor 40 to the overhead wire 1. Therefore, the regenerative brake torque of the electric motor 40 is not reduced unless the regenerative loads of the overhead wire 1 are insufficient. Therefore, during a regenerative brake, because regenerative charging in the power storing unit 50 is preferentially performed and an excess of regenerated power can be regenerated to the overhead wire 1 to prevent the power storing unit 50 from being overcharged, it is possible to collect the regenerated power to the power storing unit 50 to the maximum and obtain a continuous and stable regenerative brake that prevents reduction of the regenerative brake torque of the electric motor 40 to the maximum.

All of the regenerative-torque-reduction-amount setting unit 35, the overcharge-suppression-gain generating unit 67, and the first current-command adjusting unit 70 are explained in the configuration for generating a signal based on the voltage BES of the power storing unit 50. However, any signal other than the voltage BES can be used as long as the signal indicates a charging state of the power storing unit 50. For example, an SOC (State of charge; a charging amount) of the power storing unit 50 can be used.

The configuration for the regenerative reduction processing including the regenerative-torque-reduction-amount setting unit 35 and the subtracter 36 only has to be capable of realizing the function explained above, i.e., the reduction control for the regenerative torque of the electric motor 40 based on the magnitude of an input voltage of the inverter unit 30. The configuration can be a configuration other than that shown in FIG. 7. The signal VDT can be a gain that takes a value from 0 to 1 with respect to the requested torque PTRS. The configuration can be a configuration for reducing a current command by an amount of the torque of the electric motor 40 instead of a torque command.

The point and the effect of the configuration explained above are explained below.

The converter control unit 14 is configured to preferentially feed, when the input current IMB1 of the inverter unit 30 is an electric current in a regeneration direction, this current to the power storing unit 50 to generate the signal IMBN for performing regenerative charging and generate the signal IREGREF subjected to current suppression processing for preventing overcharging of the power storing unit 50 based on this signal IMBN and the voltage BES of the power storing unit 50. The signal IREGREF is a basic target value of an electric current of the power storing unit 50 for performing the regenerative charging control. Because the inverter control unit 34 is configured in this way, it is possible to execute control for regeneratively charging a regenerated current of the inverter unit 30 in the power storing unit 50 without delay within a tolerance of the power storing unit 50.

The forced-charging-current setting unit 602 is configured to generate, based on a value of the signal IREGREF, the signal IREGREF1 processed such that a minimum value of the magnitude of a charging current of the power storing unit 50 is equal to or larger than the forced charging current command JREF. The signal IREGREF1 is a basic target value of an electric current of the power storing unit 50 for performing the regenerative charging control and the forced charging control. According to such a configuration, it is possible to execute control for preferentially regeneratively charging a regenerated current of the inverter unit 30 in the power storing unit 50 without delay within the tolerance of the power storing unit 50 and performing forced charging of the power storing unit 50 with an arbitrary current.

The forced-charging-current setting unit 602 is configured to generate, when the input current IMB1 of the inverter unit 30 is an electric current in a power-running direction, the signal IMBP for preferentially receiving this electric current from the overhead wire 1 and generate the signal IPAS from this signal IMBP and the signal PAG. The signal IPAS is a basic target value of an electric current of the power storing unit 50 for performing the power-running discharge control. Because the forced-charging-current setting unit 602 is configured in this way, it is possible to construct a control system that can carry out assist discharge from the power storing unit 50 at an arbitrary ratio while preferentially receiving a power-running current of the inverter unit 30 from the overhead wire 1.

The forced-discharging-current setting unit 601 is configured to generate, based on a value of the signal IPAS, the signal IPAS1 processed such that a minimum value of the magnitude of a discharge current of the power storing unit 50 is equal to or larger than a forced discharge current command HREF. The signal IPAS1 is a basic target value of an electric current of the power storing unit 50 for performing the power-running discharge control and the forced discharge control. Because the forced-charging-current setting unit 602 is configured in this way, it is possible to execute control for carrying out assist discharge from the power storing unit 50 at an arbitrary ratio and performing forced discharge of the power storing unit 50 with an arbitrary current while preferentially receiving a power-running current of the inverter unit 30 from the overhead wire 1.

The converter control unit 14 is configured to generate the signal IBREF1, which is a basic target value of an electric current of the power storing unit 50, from the signal IREGREF1 and the signal IPAS1 generated as explained above. The signal IBREF1 is a basic target value of an electric current of the power storing unit 50 for realizing the functions of the power-running discharge control, the regenerative charging control, the forced charging control, and the forced discharge control. Because the signal IBREF1 is generated based on an instantaneous value of the input current IMB of the inverter unit 30 in this way, it is possible to generate the signal IBREF1 instantaneously corresponding to changes in the magnitude and the direction of the input current IMB1 of the inverter unit 30. Therefore, it is possible to execute control for realizing the power-running discharge control, the regenerative charging control, the forced charging control, and the forced discharge control having high follow-up ability to fluctuation in the input current IMB1 of the inverter unit 30.

The converter control unit 14 is configured to determine, based on the signal IBREF1 and taking into account states (a state of voltage and a state of temperature) of the power storing unit 50 and an allowable maximum current of the power storage element 51, an instantaneous value of an electric current actually dischargeable by the power storing unit 50 and generate the second current command IBREF3, which is a final command for charging and discharge currents of the power storing unit 50. Because the converter control unit 14 is configured in this way, it is possible to realize the power-running discharge control, the regenerative charging control, the forced charging control, and the forced discharge control having high follow-up ability to fluctuation in the input current IMB1 of the inverter unit 30 and execute control that takes into account the voltage state, the temperature state, and the allowable maximum current of the power storing unit 50.

The converter control unit 14 is configured to generate, based on the second current command IBREF3 and the input current IMB1 of the inverter unit 30, the signal IDREF1, which is a base of a current command for the output current IMB of the converter circuit 13. The signal IDREF is a basic command for an electric current that the converter unit 10 should bear to realize the power-running discharge control, the regenerative charging control, the forced charging control, and the forced discharge control having high follow-up ability to fluctuation in the input current IMB1 of the inverter unit 30 and execute control that takes into account the voltage state, the temperature state, and the allowable maximum current of the power storing unit 50. Because the converter control unit 14 is configured in this way, it is possible to generate a command for an instantaneous value of an electric current borne by the converter unit 10 necessary for matching an electric current of the power storing unit 50 to the second current command IBREF3.

The converter control unit 14 is configured to generate, based on the signal IDREF1 and taking into account temperature rise suppression for the current collector 2, an input voltage state of the converter unit 10, and an allowable maximum current of the converter unit 10, the first current command IDREF, which is a command for an electric current finally borne by the converter unit 10. The first current command IDREF is a current command for an electric current, which the converter unit 10 should bear, for realizing the power-running discharge control, the regenerative charging control, the forced charging control, and the forced discharge control having high follow-up ability to fluctuation in the input current IMB1 of the inverter unit 30, executing control that takes into account a voltage state, a temperature state, and a rated maximum current of the power storing unit 50, suppressing a temperature rise of the current collector 2 and a rise in an input voltage of the converter unit 10, and setting an electric current of the converter unit 10 to be equal to or smaller than the maximum allowable current. Because the converter control unit 14 is configured in this way, it is possible to match an electric current of the power storing unit 50 with the second current command IBREF3 and generate a command for an instantaneous value of the electric current of the converter unit 10 that takes into account the temperature rise suppression for the current collector 2, a regenerative load state of the overhead wire 1, and the maximum allowable current of the converter unit 10.

The converter control unit 14 is configured to carry out, based on a deviation between the first current command IDREF and the output current IMD of the converter unit 10, proportional integral control to match the output current IMD with the first current command IDREF and perform ON/OFF (PWM) control for switching elements of the converter unit 10. Because the forced-charging-current setting unit 602 is configured in this way, the control is not affected by disturbances such as a voltage change of the overhead wire 1 and a voltage change of the power storing unit 50 and it is possible to control the output current IMD of the converter unit 10 to follow the first current command IDREF at high speed even if there are fluctuations in the input current IMB1 of the inverter unit 30.

Because the converter control unit 14 is configured as explained above, it is possible to realize a control function that simultaneously satisfies matters explained below.

It is possible to execute control for preferentially regeneratively charge a regenerated current of the inverter unit 30 in the power storing unit 50 without delay within the tolerance of the power storing unit 50 and performing forced charging of the power storing unit 50 with an arbitrary current.

It is possible to carry out assist discharge from the power storing unit 50 under a predetermined condition while preferentially receiving a power-running current of the inverter unit 30 from the overhead wire 1 and execute control for performing forced discharge of the power storing unit 50 with an arbitrary current.

It is possible to execute control for realizing the power-running discharge control, the regenerative charging control, the forced charging control, and the forced discharge control having high follow-up ability to fluctuation in the input current IMB1 of the inverter unit 30 and execute control that takes into account a voltage state, a temperature state, and the maximum allowable current of the power storing unit 50.

It is possible to control the converter unit 10 taking into account temperature rise suppression for the current collector 2 and a regenerative load state of the overhead wire 1. It is possible to control the converter unit 10 taking into account the maximum allowable current of the converter unit 10.

It is possible to perform control at high speed to follow fluctuation in the input current IMB1 of the inverter unit 30 without being affected by disturbances such as a voltage of the overhead wire 1 and voltage fluctuation of the power storing unit 50.

As explained above, the converter control unit 14 can perform high-speed control on an instantaneous value basis to match an electric current or electric power passing through the converter unit 10 with a corresponding command value at an arbitrary value including zero and in an arbitrary direction. Therefore, it is possible to provide a power converting apparatus for electric motor vehicle propulsion having high system efficiency that makes it possible to optimally control a power flow among the overhead wire 1, the inverter unit 30, and the power storing unit 50 according to a traveling condition of the electric motor vehicle.

In the above explanation, the signal IMB1, the signal IMBP, the signal IPAS, the signal IPAS1, the signal IMBN, the signal IREGREF, the signal IREGREF1, the signal IBREF1, the signal IBREF2, the signal IBREF21, the signal IBREF3, the signal IDREF1, the signal IDREF2, the signal IDREF3, and the signal IDREF are respectively explained as electric currents or current commands in predetermined sections in the circuit. However, these signals can be amounts equivalent to electric powers or power commands in the sections. It is easy to replace the converter control unit 14 with a control system based on electric power making use of the law that electric power is a product of an electric current and a voltage.

This means that the electric currents and the current commands of the respective sections in the circuit concerning the signal IMB1, the signal IMBP, the signal IPAS, the signal IPAS1, the signal IMBN, the signal IREGREF, the signal IREGREF1, the signal IBREF1, the signal IBREF2, the signal IBREF21, the signal IBREF3, the signal IDREF1, the signal IDREF2, the signal IDREF3, and the signal IDREF include electric powers and power commands in the sections.

The signal IMB1 is explained as an input current of the inverter unit 30. However, it goes without saying that the configuration is also possible using a signal other than the signal IMB1 as long as the signal is an amount equivalent to an electric current or electric power passing through the inverter unit 30. In other words, the signal IMB1 means an electric current or electric power passing through the inverter unit 30, which is the second power converting unit.

In this way, when the terms "electric current" and "current command" in this specification are read as "electrical quantity" and "electrical quantity command" including "electric power" and "power command", this means that "electrical quantity" and "electrical quantity command" are concepts including not only "electric current" and "current command" but also "electric power" and "power command".

Explanation of the Operation of the System

The operation and the effect of the power converting apparatus for electric motor vehicle propulsion in the configuration explained above are explained.

Electric Motor Vehicle Power-Running-Accelerates (Power-Running Discharge Control)

When the electric motor vehicle power-running-accelerates, if the output signal PAG of the power-running-assist-amount setting unit 63 is 0, the signal IBREF3, which is the second current command and the charging and discharge current command for the power storing unit 50, is zero. Therefore, the signal IDREF, which is the first current command and the output current command for the converter circuit 13, is equal to IMB1, which is the input current of the inverter unit 30. The current control unit 110 controls the output current IMD of the converter circuit 13 to be equal to the signal IDREF. Therefore, all power-running power of the electric motor 40 is supplied from the overhead wire 1 via the converter unit 10. Consequently, when sufficient electric power can be efficiently received from the overhead wire 1, because electric power of the power storing unit 50 is not consumed, it is possible to prevent a fall in a charging amount of the power storing unit 50.

When the output signal PAG of the power-running-assist-amount setting unit 63 is set to an arbitrary value n from 0 to 1, the signal IBREF3, which is the second current command and the charging and discharge current command for the power storing unit 50, is a value having polarity opposite to that of the input current IMB1 of the inverter unit 30 and magnitude obtained by multiplying the input current IMB1 with the arbitrary value n. Therefore, the signal IDREF, which is the first current command and the output current command for the converter circuit 13, is a value obtained by subtracting an amount of the signal IBREF3, which is a discharge current amount supplied from the power storing unit 50, from the current IMB1. The current control unit 110 controls an output current of the converter circuit 13 to be equal to the signal IDREF. Therefore, n×100% of power-running power of the electric motor 40 is supplied from the power storing unit 50 and the remaining (1−n)×100% is input from the overhead wire 1 via the converter unit 10.

In this way, the power-running power supplied to the electric motor 40 can be supplied from the power storing unit 50 and the overhead wire 1 at an arbitrary ratio. Therefore, for example, in a state in which the speed of the electric motor vehicle is high and a power-running current is large or a state in which a resistance amount of the overhead wire 1 is large and the voltage of the overhead wire 1 falls, it is possible to assist-discharge a part of a necessary power-running current from the power storing unit 50. In this way, it is possible to reduce an electric current received by the overhead wire 1 while maintaining power-running performance of the electric motor vehicle. Therefore, it is possible to suppress a power loss caused by the resistance of the overhead wire 1 and a voltage drop of the overhead wire 1.

Electric Motor Vehicle Decelerates with a Regenerative Brake (Regenerative Charging Control)

A state in which the electric motor vehicle applies the regenerative brake, i.e., the inverter unit 30 regeneratively operates the electric motor 40 is explained.

When the inverter unit 30 regeneratively operates the electric motor 40, regenerated power from the electric motor 40 flows from an output side to an input side of the inverter unit 30. Therefore, the polarity of the input current IMB1 of the inverter unit 30 is negative. When a charging amount of the power storing unit 50 is low and the signal HVG is 1, the polarity of the signal IBREF3, which is the second current command and the charge discharge current command for the power storing unit 50, is positive and the magnitude thereof is a value same as the signal IMB1. Therefore, the signal IDREF, which is the first current command and the output current command for the converter circuit 13, is zero. The current control unit 110 controls an output current of the converter circuit 13 to zero to be equal to the signal IDREF. Therefore, all the regenerated power of the electric motor 40 is charged in the power storing unit 50. Because the regenerated power of the electric motor 40 is preferentially charged in the power storing unit 50, it is possible to suppress a power loss in the overhead wire 1 caused when electric power is regenerated to the overhead wire 1 and a rise in the voltage of the overhead wire 1.

When all the regenerated power from the inverter unit 30 is charged in the power storing unit 50 during a regenerative brake, if the charging amount of the power storing unit 50 increases and the voltage BES exceeds the first setting value, the magnitude of the signal IREGREF is suppressed and the magnitude of the second current command IBREF3 is suppressed. The first current command IDREF having magnitude equal to a suppressed amount is generated and the suppression amount is regenerated to the overhead wire 1. Therefore, the regenerative torque of the electric motor 40 is not reduced and a continuous and stable regenerative brake is obtained.

Although not shown in the figure, it is possible to regenerate the regenerated power of the electric motor 40 to the power storing unit 50 and the overhead wire 1 at an arbitrary ratio by arbitrarily multiplying the signal IBREF3, which is the second current command and the charging and discharge current command for the power storing unit 50, with a gain n (n=0 to 1).

When regenerative loads of the overhead wire 1 are insufficient, the signal IDREF, which is the first current command adjusted to suppress a rise in the input voltage ESD of the converter unit 10 with the input-voltage-rise suppressing unit 102 and is the output current command for the converter circuit 13, is generated and the output current IMD of the converter circuit 13 is controlled to match the signal IDREF. Therefore, it is possible to prevent the converter unit 10 from detecting an excess voltage to be tripped or damaging an apparatus connected to the overhead wire 1.

Power storing unit 50 is forcibly charged (forced charging control)

Forced charging of the power storing unit 50 performed while the electric motor vehicle is stopped (the input current IMB1 of the inverter unit 30=0) is explained as an example. First, the signal JREF, which is a forced charging current command, is set to 100 amperes. Then, the second current command IBREF3 is 100 amperes and the first current command IDREF is 100 amperes. Therefore, the converter unit 10 charges the power storing unit 50 from the overhead wire 1 at 100 amperes.

Forced charging of the power storing unit 50 performed when power-running assist control is not carried out (the signal PAG=0) while the electric motor vehicle is power-running (the input current IMB1 of the inverter unit 30>0) is explained as an example. As explained above, the signal JREF is set to 100 amperes. Then, the signal IREGREF1 is 100 amperes. Because the signal PAG is 0, the signal IPAS1 is 0. Therefore, the second current command IBREF3 is 100 amperes. The first current command IDREF is a total of the input current IMB1 of the inverter unit 30 and the IBREF3 (=100 amperes). The converter unit 10 receives a total current of the input current IMB1 of the inverter unit 30 and IBREF3 (=100 amperes) from the overhead wire 1. The power storing unit 50 can be charged at 100 amperes obtained by subtracting the electric current IMB1 to the inverter unit 30 from the total current.

Forced charging of the power storing unit 50 performed while the electric motor vehicle is regenerating (the input current IMB1 of the inverter unit 30<0) is explained as an example. First, as explained above, the signal JREF is set to 100 amperes. When it is assumed that the input current IMB1 of the inverter unit 30 is, for example, −300 amperes, the signal IREGREF is 300 amperes. Because this is larger than the signal JREF (=100 amperes), the signal IREGREF1 is 300 amperes. Therefore, the second current command IBREF3 is 300 amperes. The first current command IDREF is zero because the first current command IDREF is a total of the input current IMB1 of the inverter unit 30 (=−300 amperes) and the IBREF3 (=300 amperes). The converter unit 10 does not acquire an electric current from the overhead wire 1. The power storing unit 50 performs charging only with a regenerated current from the inverter unit 30.

As it is seen from the above explanation, if the input current IMB1 of the inverter unit 30 is, for example, −50 amperes, the converter unit 10 acquires 50 amperes, which is a difference from the signal JREF (=100 amperes), from the overhead wire 1. The power storing unit 50 is charged at 100 amperes obtained by adding up a regenerated current from the inverter unit 30 and an electric current from the overhead wire 1. In other words, in the forced charging control, the magnitude of a charging current of the power storing unit 50 can be set to at least a value set by the signal JREF (=100 amperes). This forced charging control is useful when it is desired to increase a charging amount of the power storing unit 50, for example, when power-running assist discharge is frequently used or before the electric motor vehicle is caused to travel in a non-electrified section.

Power Storing Unit 50 is Forcibly Discharged (Forced Discharge Control)

Forced discharge of the power storing unit 50 performed while the electric motor vehicle is stopped (the input current IMB1 of the inverter unit 30=0) is explained as an example. First, the signal HREF, which is the forced discharge current command, is set to −100 amperes. Then, the second current command IBREF3 is −100 amperes and the first current command IDREF is −100 amperes. Therefore, the converter unit 10 performs discharge from the power storing unit 50 to the overhead wire 1 at 100 amperes.

Forced discharge of the power storing unit 50 performed when power-running assist control is not carried out (the signal PAG=0) while the electric motor vehicle is power-running (the input current IMB1 of the inverter unit 30>0) is explained as an example. As explained above, the signal HREF is set to −100 amperes. When the input current IMB1 of the inverter unit 30 is, for example, 300 amperes, the signal IPAS is −300 amperes. Because this IPAS is smaller than the signal HREF (−100 amperes), the signal IPAS1 is −300 amperes. Therefore, the second current command IBREF3 is −300 amperes. The first current command IDREF is zero because the first current command IDREF is a total of the input current IMB1 (=300 amperes) of the inverter unit 30 and IBREF3 (=−300 amperes). The converter unit 10 does not perform discharge to the overhead wire 1 and the power storing unit 50 is discharged at a power-running current (300 amperes) of the inverter unit 30.

As it is seen from the above explanation, if the input current IMB1 of the inverter unit 30 is, for example, 50 amperes, the converter unit 10 discharges 50 amperes, which is a difference from the signal HREF (=−100 amperes), to the overhead wire 1. The power storing unit 50 is discharged at 100 amperes obtained by adding up the electric current IMB1 to the inverter unit 30 and a discharge current to the overhead wire 1. In other words, in the forced discharge control, the magnitude of a discharge current of the power storing unit 50 can be set to at least 100 amperes. This forced discharge control is useful when it is desired to reduce a charging amount of the power storing unit 50, for example, when the operation of the electric motor vehicle ends.

During both the controls, the signal IDREF, which is the first current command, adjusted by the overcharge-suppression-gain generating unit 67 and the first current-command adjusting unit 70 to prevent the voltage BES of the power storing unit 50 from exceeding the second setting value or the sixth setting value, which is the upper limit value, or falling below the eighth setting value, which is the lower limit value, during an operation is generated. The output current IMD of the converter circuit 13 is controlled to match the signal IDREF. Therefore, it is possible to suppress deterioration due to overcharging or over-discharge of the power storage element 51.

The signal IDREF, which is the first current command, is generated based on the second current command IBREF3 adjusted by the overcharge-suppression-gain generating unit 67 and the first current-command adjusting unit 70 to prevent the voltage BES of the power storing unit 50 from exceeding the second setting value, which is the upper limit value, or falling below the eighth setting value, which is the lower limit value, during an operation and the input current IMB1 of the inverter unit 30. The output current IMD of the converter circuit 13 is controlled to match the signal IDREF. Therefore, even when a charging amount of the power storing unit 50 is high and the power storing unit 50 cannot be sufficiently regeneratively charged or when the charging amount is low and the power storing unit 50 cannot be sufficiently discharged, an electric current of an excess or insufficient amount that cannot be borne by the power storing unit 50 in a power-running current or a regenerated current of the inverter unit 30 can be continuously and instantaneously received from the overhead wire 1 or regenerated to the overhead wire 1. Therefore, power-running or a regenerative operation of the inverter unit 30 is not affected and an operation state of the electric motor 40 is not affected.

The signal IDREF, which is the first current command, adjusted by the second current-command adjusting unit 80 to reduce an electric current of the power storing unit 50 when the temperature of the power storing unit 50 is higher than a predetermined value and reduce, in particular, a charging current when the temperature of the power storing unit 50 is lower than the predetermined value is generated. The output current IMD of the converter circuit 13 is controlled to match the signal IDREF. Therefore, it is possible to suppress deterioration of the power storage element 51 due to charging and discharge under high temperature and under low temperature.

The signal IDREF, which is the first current command, is generated based on the second current command IBREF3 adjusted by the second current-command adjusting unit 80 to reduce an electric current of the power storing unit 50 when the temperature of the power storing unit 50 is higher than the predetermined value and reduce, in particular, a charging current when the temperature of the power storing unit 50 is lower than the predetermined value and the input current IMB1 of the inverter unit 30. The output current IMD of the converter circuit 13 is controlled to match the signal IDREF. Therefore, even when the temperature of the power storing unit 50 is outside a proper range and the power storing unit 50 cannot be sufficiently charged and discharged, an electric current of an excess or insufficient amount that cannot be borne by the power storing unit 50 in a power-running current or a regenerated current of the inverter unit 30 can be continuously and instantaneously received from the overhead wire 1 or regenerated to the overhead wire 1. Therefore, power-running or a regenerative operation of the inverter unit 30 is not affected and an operation state of the electric motor 40 is not affected.

Further, when the electric motor vehicle is stopped or when the electric motor vehicle travels at low speed, the magnitude of the input current ISD is limited to be low by the third current-command adjusting unit 100 to make it possible to secure the magnitude of the input current ISD large in a region where the speed of the electric motor vehicle is high and, in particular, suppress a collected current of the current collector 2 when the electric motor vehicle is stopped or when the electric motor vehicle travels at low speed. Therefore, it is possible to suppress a temperature rise in the current collector 2 and the contact section of the overhead wire 1 and the current collector 2.

The power storing unit 50 is arranged to be directly connected to the converter unit 10 and the inverter unit 30. A charging and discharge current command for the power storing unit 50 is generated by the converter control unit 14 of the converter unit 10. An electric current passing through the converter circuit 13 is controlled based on this charging and discharge current command. Therefore, charging and discharge currents of the power storing unit 50 can be controlled to an optimum value having arbitrary magnitude including zero and in an arbitrary direction by the converter unit 10. As a result, a power converting circuit that controls charging and discharge currents to and from the power storing unit 50 does not need to be provided between the converter unit 10 and the power storing unit 50 or between the inverter unit 30 and the power storing unit 50. A small and low-cost system configuration is possible.

As explained above, electric power from the overhead wire is input to the converter unit. The inverter unit that drives the electric motor, which is a load, and the power storage element are connected in parallel to each other on the output side of this converter unit. The converter unit includes the converter control unit that can control an electric current to the power storage element to an optimum value having arbitrary magnitude including zero and in an arbitrary direction. Therefore, it is possible to configure a power converting apparatus for electric motor vehicle propulsion suitable for a use in which regeneration from the inverter unit to the power storage element and discharge from the power storage element to the inverter unit are frequently used.

In the form of the converter unit 10 explained above, the converter unit 10 receives input of a direct current from the current collector 2 and outputs a direct current. However, a form may be adopted in which the converter unit 10 receives input of an alternating current and outputs a direct current. Such a configuration is suitable in the case of an electric motor vehicle that travels in an AC electrified section where the overhead wire 1 is for an alternating current. In this case, the converter unit 10 desirably includes a PWM converter circuit. The PWM converter circuit is a publicly-known technology. As the configuration of the converter control unit 14, converter-input-current control means for controlling an electric current of an AC input based on the signal IDREF, which is the first current command, only has to be added. Concerning the converter-input-current control means, various configurations are also publicly known.

In the above explanation, the power converting apparatus for electric motor vehicle propulsion includes one converter unit 10, one inverter unit 30, and one power storing unit 50. However, it is also easy to apply the contents of the present invention, for example, when a plurality of the converter units 10, a plurality of the inverter units 30, and a plurality of the power storing units 50 are connected in parallel to one another to extend the system.

The configuration explained in the embodiment indicates an example of the contents of the present invention. It goes without saying that the configuration can be combined with another publicly-known technology and the configuration can be changed, for example, partially omitted without departing from the spirit of the present invention.

INDUSTRIAL APPLICABILITY

As explained above, the power converting apparatus for electric motor vehicle propulsion according to the present invention is useful for a use in which power regeneration from the inverter unit to the power storing unit and power supply from the power storing unit to the inverter unit are frequently used.

REFERENCE SIGNS LIST

1 OVERHEAD WIRE
2 CURRENT COLLECTOR
3 WHEEL
4 RAIL
10 CONVERTER UNIT
13 CONVERTER CIRCUIT
131 FILTER REACTOR
132 FILTER CAPACITOR
133A PRIMARY-SIDE UPPER ARM SWITCHING ELEMENT
133B PRIMARY-SIDE LOWER ARM SWITCHING ELEMENT
133C SECONDARY-SIDE UPPER ARM SWITCHING ELEMENT
133D SECONDARY-SIDE LOWER ARM SWITCHING ELEMENT
134 SMOOTHING REACTOR
135 SMOOTHING CAPACITOR
14 CONVERTER CONTROL UNIT
30 INVERTER UNIT
33 INVERTER CIRCUIT
34 INVERTER CONTROL UNIT
35 REGENERATIVE-TORQUE-REDUCTION-AMOUNT SETTING UNIT
36, 92 SUBTRACTERS
37 TORQUE CONTROL UNIT
40 ELECTRIC MOTOR
41 ROTATION DETECTOR
50 POWER STORING UNIT
51 POWER STORAGE ELEMENT
52 TEMPERATURE DETECTOR
60 FIRST CURRENT-COMMAND GENERATING UNIT
61 NEGATIVE-VALUE CUT UNIT
62, 66 POLARITY INVERSING GAINS
63 POWER-RUNNING-ASSIST-AMOUNT SETTING UNIT
64, 68, 101 MULTIPLIERS
65, 93 POSITIVE-VALUE CUT UNITS
67 OVERCHARGE-SUPPRESSION-GAIN GENERATING UNIT
69, 90 ADDERS
601 FORCED-DISCHARGE-CURRENT SETTING UNIT
602 FORCED-CHARGING-CURRENT SETTING UNIT
70 FIRST CURRENT-COMMAND ADJUSTING UNIT
71A SECOND OVERCHARGE-SUPPRESSION-GAIN GENERATING UNIT
71B OVER-DISCHARGE-SUPPRESSION-GAIN GENERATING UNIT
72A, 72B SWITCHES
73 MULTIPLIER
80 SECOND CURRENT-COMMAND ADJUSTING UNIT
81 CURRENT-COMMAND LIMITING UNIT
91 INPUT-CURRENT-LIMIT-VALUE SETTING UNIT
94 ABSOLUTE-VALUE COMPUTING UNIT
95 INPUT-CURRENT LIMITING UNIT
100 THIRD CURRENT-COMMAND ADJUSTING UNIT
102 INPUT-VOLTAGE-RISE SUPPRESSING UNIT
103 CURRENT-COMMAND LIMITING UNIT
110 CURRENT CONTROL UNIT

The invention claimed is:

1. A power converting apparatus for electric motor vehicle propulsion comprising:
a first power converting unit that converts a voltage input from an external power supply into a desired direct current and outputs the direct current and is configured to perform power regeneration from an output side to the external power supply side;
a second power converting unit that is connected to the output side of the first power converting unit and drives a load;
a power storing unit that is connected to the output side of the first power converting unit and includes a power storage element; and
a first control unit that controls the first power converting unit, wherein
the first control unit includes:
a first electrical-quantity-command generating unit that generates, based on magnitude or polarity of a first electric current or electric power passing through the second power converting unit, a first electrical quantity command for adjusting a second electric current or electric power of the power storing unit to a predetermined value; and
a current control unit that generates, based on a deviation between a second electrical quantity command, which is a command for a third electric current or electric power passing through the first power converting unit generated based on a sum of the first electrical quantity command and the first electric current or the electric power passing through the second power converting unit, and the third electric current or the electric power passing through the first power converting unit, a switching signal such that the third electric current or the electric power passing through the first power converting unit matches the second electrical quantity command.

2. The power converting apparatus for electric motor vehicle propulsion according to claim 1, wherein the first control unit is configured to apply, based on a deviation between the second electrical quantity command and the third electric current or the electric power passing through the first power converting unit, control for minimizing the deviation to the first power converting unit.

3. The power converting apparatus for electric motor vehicle propulsion according to claim 1, wherein the first control unit is configured to generate, when the first electric current or electric power passing through the second power converting unit is a flow in a regeneration direction, the first electrical quantity command that can control the third electric current or the electric power passing through the first power converting unit to substantially zero.

4. The power converting apparatus for electric motor vehicle propulsion according to claim 1, wherein the first control unit is configured to generate, when the first electric current or electric power passing through the second power converting unit is a flow in a regeneration direction, the second electrical quantity command that can control the second electric current or the electric power of the power storing unit to a magnitude the same as that of the first electric current or the electric power passing through the second power converting unit.

5. The power converting apparatus for electric motor vehicle propulsion according to claim 1, wherein the first control unit is configured to perform, when the first electric current or electric power passing through the second power converting unit is a flow in the regeneration direction, control for adjusting, based on a value indicating a charging state of the power storing unit, the third electric current or the electric power passing through the first power converting unit and regenerating a part of a regenerated current or regenerated power passing through the second power converting unit to the external power supply.

6. The power converting apparatus for electric motor vehicle propulsion according to claim 1, wherein the first control unit is configured to adjust, when the first electric current or the electric power passing through the second power converting unit is a flow in the regeneration direction, based on a value indicating a charging state of the power storing unit, the first electrical quantity command generated by the first electrical-quantity-command generating unit and generate the second electrical quantity command based on the first electrical quantity command and the first electric current or the electric power passing through the second power converting unit.

7. The power converting apparatus for electric motor vehicle propulsion according to claim 1, wherein
the first control unit is configured to regenerate, when the first electric current or electric power passing through the second power converting unit is a flow in the regeneration direction and a value indicating a charging state of the power storing unit exceeds a first setting value, to the external power supply side, a part of the first electric current or the electric power passing through the second power converting unit, and
a second control unit, which is a control unit for the second power converting unit, is configured to reduce a regenerated current or regenerated power from an electric motor when the value indicating the charging state of the power storing unit exceeds a third setting value set to a value larger than the first setting value.

8. The power converting apparatus for electric motor vehicle propulsion according to claim 1, wherein
the first control unit is configured to regenerate, when the first electric current or electric power passing through the second power converting unit is a flow in the regeneration direction and a value indicating a charging state of the power storing unit exceeds a second setting value, to the external power supply side, all of the first electric current or the electric power passing through the second power converting unit, and a second control unit, which is a control unit for the second power converting unit, is configured to reduce a regenerated current or regenerated power from the electric motor when the value indicating the charging state of the power storing unit exceeds a third setting value set to a value larger than the second setting value.

9. The power converting apparatus for electric motor vehicle propulsion according to claim 1, wherein the first control unit is configured to control, when the first electric current or electric power passing through the second power converting unit is a flow in a power-running direction, a distribution at an arbitrary ratio of an amount of electricity received from the external power supply and an amount of electricity supplied from the power storing unit of the first electric current or the electric power passing through the second power converting unit.

10. The power converting apparatus for electric motor vehicle propulsion according to claim 1, wherein the first control unit is configured to generate, when the first electric current or the electric power passing through the second power converting unit is a flow in a power-running direction, based on an amount of an arbitrary ratio of the first electric current or the electric power passing through the second power converting unit, the first electrical quantity command generated by the first electrical-quantity-command generating unit.

11. The power converting apparatus for electric motor vehicle propulsion according to claim 1, wherein the first control unit is configured to perform, when the first electric current or the electric power passing through the second power converting unit is a flow in a power-running direction, control for reducing the first electrical quantity command generated by the first electrical-quantity-command generating unit to substantially zero.

12. The power converting apparatus for electric motor vehicle propulsion according to claim 1, wherein the first control unit is configured to generate, when the first electric current or electric power passing through the second power converting unit is a flow in a power-running direction, the second electrical quantity command that can control the first electric current or the electric power of the power storing unit to substantially zero.

13. The power converting apparatus for electric motor vehicle propulsion according to claim 1, wherein the first control unit is configured to generate, irrespective of a magnitude of the first electric current or electric power passing through the second power converting unit, the second electrical quantity command for making it possible to discharge an electric current or electric power equivalent to a separately-set forced discharge current value from the power storing unit.

14. The power converting apparatus for electric motor vehicle propulsion according to claim 1, wherein the first control unit is configured to generate, irrespective of a magnitude of the first electric current or electric power passing through the second power converting unit, the second electrical quantity command for making it possible to charge an electric current or electric power equivalent to a separately-set forced charging current value in the power storing unit.

15. The power converting apparatus for electric motor vehicle propulsion according to claim 1, wherein the first electrical-quantity-command generating unit includes a first electrical-quantity-command adjusting unit that receives input of a signal indicating a charging state of the power storing unit and performs, based on the signal indicating the charging state, adjustment of the first electrical quantity command generated by the first electrical-quantity-command generating unit.

16. The power converting apparatus for electric motor vehicle propulsion according to claim 1, wherein the first electrical-quantity-command generating unit includes a second electrical-quantity-command adjusting unit that receives input of temperature of the power storing unit and performs, based on temperature of the power storage element, adjustment of the first electrical quantity command generated by the first electrical-quality-command generating unit.

17. The power converting apparatus for electric motor vehicle propulsion according to claim 1, wherein the first control unit is configured to receive input of an input voltage of the first power converting unit and perform adjustment of the second electrical quantity command based on the input voltage.

18. The power converting apparatus for electric motor vehicle propulsion according to claim 1, wherein the first control unit is configured to generate the second electrical quantity command adjusted such that an input current or input power of the first power converting unit is equal to or smaller than a predetermined value.

19. The power converting apparatus for electric motor vehicle propulsion according to claim 1, wherein the first control unit generates the second electrical quantity command determined to be capable of controlling a charging current or charging power and a discharge current or discharge power of the power storing unit respectively to be equal to or smaller than predetermined limit values.

20. The power converting apparatus for electric motor vehicle propulsion according to claim 1, wherein the first control unit generates the second electrical quantity command determined to be capable of controlling a magnitude of an electric current or electric power of the first power converting unit to be equal to or smaller than a predetermined limit value.

21. The power converting apparatus for electric motor vehicle propulsion according to claim 1, wherein
the first electrical-quantity-command generating unit includes:
a first control system that reduces, when the first electric current or electric power passing through the second power converting unit is an electric current or electric power having a first polarity, which is a polarity on a side for driving the load, an electric current or electric power component having a second polarity, which is an opposite polarity of the first polarity, to zero; and
a second control system that reduces, when the first electric current or electric power passing through the second power converting unit is an electric current or electric power having the second polarity, an electric current or electric power component having the first polarity to zero, and
the first electrical-quantity-command generating unit generates the second electrical quantity command based on an output of the first control system and an output of the second control system.

22. The power converting apparatus for electric motor vehicle propulsion according to claim 1, wherein
the first electrical-quantity-command generating unit includes:
a negative-value cut unit that outputs zero when the first electric current or the electric power passing through the second power converting unit takes a negative value; and
a positive-value cut unit that outputs zero when the first electric current or the electric power passing through the second power converting unit takes a positive value, and
the first electrical-quantity-command generating unit generates the second electrical quantity command based on output signals of the negative-value cut unit and the positive-value cut unit.

* * * * *